US009363713B1

(12) United States Patent
Oroskar et al.

(10) Patent No.: US 9,363,713 B1
(45) Date of Patent: Jun. 7, 2016

(54) EXCHANGE OF NETWORK SIGNALING VALUES BETWEEN BASE STATIONS TO IMPROVE HANDOVER PERFORMANCE

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/714,918

(22) Filed: May 18, 2015

(51) Int. Cl.
*H04W 36/00* (2009.01)
*H04W 24/10* (2009.01)

(52) U.S. Cl.
CPC .......... *H04W 36/0011* (2013.01); *H04W 24/10* (2013.01); *H04W 36/0094* (2013.01)

(58) Field of Classification Search
CPC ............ H04W 36/0011; H04W 24/10; H04W 36/0094
USPC ................................................. 455/436–444
See application file for complete search history.

(56) References Cited

U.S. PATENT DOCUMENTS

| 8,891,489 | B2* | 11/2014 | Attar | H04W 36/30 370/332 |
|---|---|---|---|---|
| 2009/0163208 | A1* | 6/2009 | Rao | H04W 36/06 455/436 |
| 2012/0028676 | A1* | 2/2012 | He | H04W 36/0094 455/525 |
| 2015/0092669 | A1* | 4/2015 | Chen | H04W 72/1289 370/329 |
| 2015/0319666 | A1* | 11/2015 | Kang | H04W 36/30 370/332 |

* cited by examiner

*Primary Examiner* — Shahriar Behnamian

(57) ABSTRACT

Disclosed is a method and system for accounting for network signaling values in handover decisions. A serving base station may receive a message from a served user equipment device (UE) indicating that handover condition is met for handing over to one or more target base stations. The serving base station can determine a respective network signaling value being used by each target base station, and thereby determine how much uplink attenuation the UE would be directed to apply for each potential handover. The serving base station can also determine its downlink power and that the target base stations as measured by the UE. The serving base station can then make a handover decision taking account of a change in uplink attenuation for each potential handover.

20 Claims, 14 Drawing Sheets

EXCHANGE OF NETWORK SIGNALING VALUES BETWEEN BASE STATIONS TO IMPROVE HANDOVER PERFORMANCE

BACKGROUND

Unless otherwise indicated herein, the materials described in this section are not prior art to the claims and are not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of UEs, initiation of communications, handover of between coverage areas, and other functions related to air interface communication.

In accordance with the air interface protocol, each coverage area may operate on one or more carrier frequencies or ranges of carrier frequencies. Further, each coverage area may define a number of channels or specific resources for carrying signals and information between the base station and UEs. For instance, certain resources on the downlink may be reserved to carry a pilot or reference signal that UEs may detect as an indication of coverage and may measure to evaluate coverage quality. Further, certain resources on the uplink may be reserved to carry access requests from UEs seeking to gain access to the base station. And certain resources on the downlink may be reserved to carry control messaging such as paging messages and random access response messages from the base station. In addition, certain resources on the uplink and downlink may be set aside to carry bearer traffic (e.g., user communications) in a manner assigned or scheduled by the base station for instance.

When a UE is within coverage of a base station, the base station may from time to time transmit downlink control signaling to the UE. The purpose of such downlink control signaling may depend on the air interface protocol and the circumstances. By way of example, each coverage area may define a downlink control channel that may carry certain information such as control channel formatting information, a downlink reference signal that UEs may detect as an indication of coverage, system information, paging information, and the like, or may define various downlink control channels for carrying subsets of this information.

In general, a UE may operate in a particular coverage area provided by a base station by transmitting to the base station an "attach" request or the like to register with the base station and trigger reservation of network resources for the UE, and then operating in a connected mode or an idle mode. In the connected mode, the UE may have assigned air interface resources defining an air interface "connection," and the UE and the base station may be set to exchange bearer data with each other, with the base station possibly providing downlink control signaling to the UE to assign specific air interface resources on which the bearer data communication is to occur. After a timeout period of no bearer data communication between the UE and the base station, or for other reasons, the UE may then transition from the connected mode to the idle mode, with the base station releasing the UE's air interface connection so as to conserve air interface resources. In the idle mode, the UE may then monitor a downlink control channel to receive overhead system information and to check for any page messages destined to the UE. If the UE then receives a page message to which the UE will respond and/or if the UE seeks to engage in bearer communication, the UE may then transmit on an uplink control channel to the base station a random access preamble or other such request, to which the base station may respond on a downlink control channel, and the UE may transition back to the connected mode.

A UE may also move between neighboring coverage areas of one or more base stations. More specifically, as a UE moves between wireless coverage areas of a wireless communication system, such as between different base stations, or when network conditions change or for other reasons, the UE may "hand off" or "handover" from operating in one coverage area to operating in another coverage area. In a usual case, this handover process is triggered by the UE monitoring the signal strength of various nearby available coverage areas, either as a matter of routine operation, or in response to a directive by the UE's serving base station to monitor for one or another handover trigger condition. When a handover condition is met, the UE's serving base station may then initiate a handover procedure. By convention, a UE is said to handover from a "source" (or serving) base station to a "target" base station.

OVERVIEW

A wireless cellular network, or more generally a wireless communication system may be operated by a wireless service provider, and multiple wireless service providers may coexist in a wireless marketplace, offering various services to subscribing customers, for example. Each wireless service provider may be licensed by a regulatory agency to operate in one or more distinct, non-overlapping regions, or "bands," of the radio frequency (RF) spectrum. For instance, in the United States, the Federal Communications Commission (FCC) holds regulatory authority over the RF spectrum for this purpose. Among the concerns and issues relating to operating in different regions of the RF spectrum is minimization and/or avoidance of RF emission "leaking" into one band due to transmissions originating from an adjacent or nearby band. A regulatory agency, such as the FCC, may set one or more requirements specifying allowable levels of power leakage, while not necessarily prescribing how to achieve the specified levels. And various design and engineering standards may be devised that specify procedures and protocols aimed (possibly among other purposes) at meeting such regulator mandates.

One approach to controlling cross-carrier power leakage is to implement an operational protocol by which a base station may signal to UEs in its coverage area an instruction or notification to attenuate their respective uplink transmission powers under circumstances in which a risk or likelihood of excessive cross-carrier power leakage may be unacceptable, for example. The transmitted instruction can take the form of a network signaling value that encodes an amount of attenuation that the UE should apply to its uplink transmission power. For example, a wireless service provider may be able to ensure compliance of some UEs with one or more power leakage mandates, such that signaling an instruction for attenuation is not necessary. However, the service provider may also provide service to one or more other UEs that the wireless service provider cannot verify are similarly compliant with the one or more rules governing power leakage. As a consequence, a base station of the wireless service provider may not be able to ensure that power leakage will not occur unless it can notify all the UEs to apply a certain amount of attenuation. Thus, the base station may then broadcast a signaling message to all UEs instructing them to apply attenuation. There may be other circumstances in which a base station will broadcast a signaling message to all UEs instructing them to apply attenuation.

While this approach can have the intended effect of avoiding or minimizing cross-carrier power leakage, not all base stations of a wireless communication system will necessarily broadcast the same attenuation directive at the same time to the UEs that they respectively serve. It can therefore happen that neighboring base stations direct their respective UEs to apply different amounts of uplink attenuation. As a result, it is possible that in the process of handing over from a serving (source) base station to a target base station, a UE may be directed to change the amount of attenuation it is applying to its uplink transmission power. In particular, if a UE engaged in an active call or other communication session with a serving base station hands over to a target base station that directs the UE increase its uplink attenuation, the call or other communication session can be subject to some degree of degradation, including an increased possibility of being dropped or interrupted.

In conventional operation, the conditions that trigger a handover do not take account of a possible change in uplink attenuation that may result for executing handover. Consequently, if a change in uplink attenuation that occurs as part of a handover negatively impacts a call (e.g., causes the call to drop), this negative outcome won't be known until the handover is complete, by which time it may be too late to take any compensatory or corrective action. It would therefore be desirable to be able to determine what, if any, change in uplink attenuation will result from a handover of a UE from one base station (or coverage area) to another before the handover is initiated. Accordingly, example embodiments herein provide a method and system for accounting for network signaling values being used by a source and one or more target base stations in handover decisions.

Hence, in one respect, various embodiments of the present invention provide a method operable in a base station of a wireless communication network, wherein the base station serves a user equipment device (UE) and directs the UE to apply to its uplink transmission power an amount of attenuation determined according to an uplink-attenuation parameter being used by the base station, the method comprising: based on a downlink power measurement message (DPMM) received by the base station from the UE, the base station determining that a handover condition is met for a handover of the UE from the base station to any of one or more target base stations indicated in the DPMM; determining, by the base station, a respective uplink-attenuation parameter being used by each respective target base station of the one or more target base stations, wherein the respective uplink-attenuation parameter used by each respective target base station corresponds to an amount of attenuation that the respective target base station directs its served UEs to apply to their respective uplink transmission power; and based on a comparison of each determined respective uplink-attenuation parameter with the uplink-attenuation parameter being used by the base station, the base station making a handover determination of whether (i) to initiate handover of the UE to one of the one or more target base stations, or (ii) to continue serving the UE instead of initiating handover of the UE to any of the one or more target base stations.

In another respect, various embodiments of the present invention provide a base station operable in a wireless communication network, wherein the base station is configured to serve a user equipment device (UE) and to direct the UE to apply to its uplink transmission power an amount of attenuation determined according to an uplink-attenuation parameter being used by the base station, the base station comprising: one or more processors; and memory accessible to the one or more processors, and storing machine language instructions that, upon execution by the one or more processors, cause the base station to carry out operations including: based on a downlink power measurement message (DPMM) received by the base station from the UE, determining that a handover condition is met for a handover of the UE from the base station to any of one or more target base stations indicated in the DPMM, determining a respective uplink-attenuation parameter being used by each respective target base station of the one or more target base stations, wherein the respective uplink-attenuation parameter used by each respective target base station corresponds to an amount of attenuation that the respective target base station directs its served UEs to apply to their respective uplink transmission power, and based on a comparison of each determined respective uplink-attenuation parameter with the uplink-attenuation parameter being used by the base station, making a handover determination of whether (i) to initiate handover of the UE to one of the one or more target base stations, or (ii) to continue serving the UE instead of initiating handover of the UE to any of the one or more target base stations.

Further, in still another respect, various embodiments of the present invention provide a non-transitory computer readable medium having stored thereon instructions that, upon executing by one or more processors of a base station, cause the base station to carry out operations, wherein the base station is configured to serve a user equipment device (UE) and to direct the UE to apply to its uplink transmission power an amount of attenuation determined according to an uplink-attenuation parameter being used by the base station, wherein the operations comprise: based on a downlink power measurement message (DPMM) received by the base station from the UE, determining that a handover condition is met for a handover of the UE from the base station to any of one or more target base stations indicated in the DPMM; determining a respective uplink-attenuation parameter being used by each respective target base station of the one or more target base stations, wherein the respective uplink-attenuation parameter used by each respective target base station corresponds to an amount of attenuation that the respective target base station directs its served UEs to apply to their respective uplink transmission power; and based on a comparison of each determined respective uplink-attenuation parameter with the uplink-attenuation parameter being used by the base station, making a handover determination of whether (i) to initiate handover of the UE to one of the one or more target base stations, or (ii) to continue serving the UE instead of initiating handover of the UE to any of the one or more target base stations.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
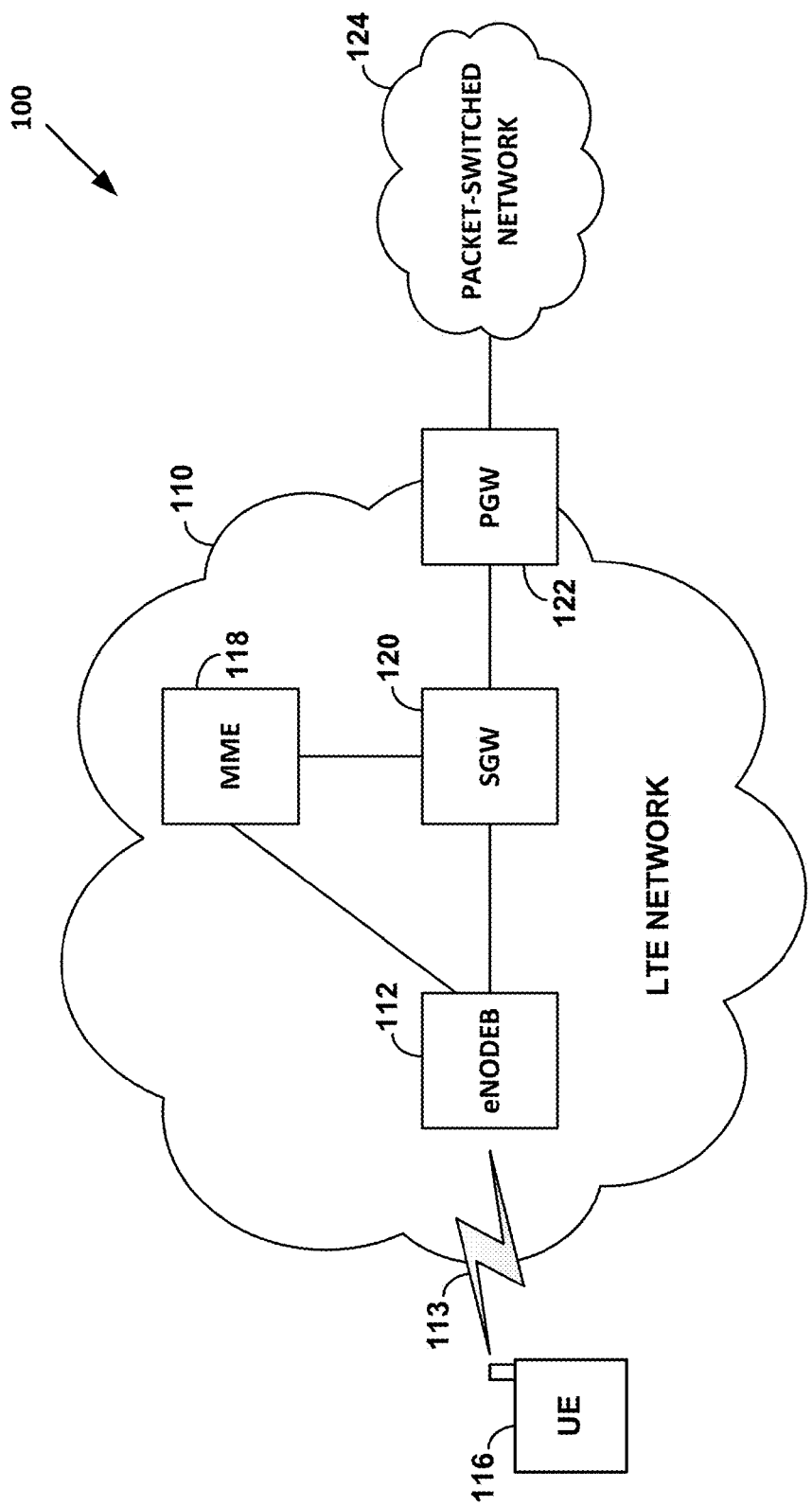
FIG. 1 is a simplified block diagram of a wireless communication system in which an example method of accounting for network signaling values in handover decisions can be implemented, in accordance with an example embodiment.

Referring to the drawings, FIG. 1 is a simplified block diagram of a wireless communication system 100 in which an example of the present method can be implemented. In particular, FIG. 1 includes by way of example a representative LTE radio access network (RAN) 110 including an example LTE base station known as an eNodeB 112, which radiates to provide a wireless coverage area defining an LTE air interface 113 through which the eNodeB may serve one or more UEs. The eNodeB is then shown coupled with core LTE network infrastructure, which may include a mobility management entity (MME) 118, a serving gateway (SGW) 120 and a packet-data network gateway (PGW) 122 providing connectivity with a packet-switched network 124 such as the Internet. Shown within coverage of the eNodeB 112 is then a representative UE 116. In practice, the LTE access network may be operated by a cellular wireless service provider, and the UE may subscribe to service of that provider.

In general, a wireless service provider may operate one or more RANs, such as the LTE RAN 110, as a "public land mobile network" ("PLMN") for serving UEs (or other mobile terminals) that subscribe to service of the provider. For example, a service provider may operate an LTE RAN as an LTE PLMN and may provide UEs with subscriptions that allow the terminals to receive LTE service from that PLMN. As another example, a service provider may operate a CDMA RAN as a CDMA PLMN and may provide UEs with subscriptions that allow the terminals to receive CDMA service from that PLMN. And as another example, a service provider may operate both an LTE PLMN and a CDMA PLMN and may provide UEs with subscriptions that allow the UEs to receive both LTE service from the LTE PLMN and CDMA service from the CDMA PLMN.

In practice, a RAN operating as a PLMN may have an associated PLMN identifier (PLMN ID), and base stations of the RAN may be arranged to broadcast that PLMN ID to indicate that the base stations are part of that PLMN. UEs that subscribe to service of a wireless service provider's PLMN may then be provisioned with data indicating the PLMN ID of the PLMN and with logic that causes the UEs to prefer service by base stations broadcasting that PLMN ID. Further, UEs that subscribe to service of multiple PLMNs, such as both an LTE PLMN and a CDMA PLMN may be provisioned with data indicating the PLMN IDs of each such PLMN and with logic that causes the UEs to prefer service by base stations broadcasting one or more of those PLMN IDs.

A wireless service provider may also allow one or more of its PLMNs to serve UEs that subscribe to service of other PLMNs, pursuant to a roaming agreement. In particular, a first wireless service provider providing a first PLMN may enter into a roaming agreement with a second wireless service provider providing a second PLMN, according to which the first PLMN will serve UEs that subscribe to the second PLMN, and the second wireless service provider will compensate the first service provider for providing that service. As such, a given UE that subscribes to service of the second PLMN but that is not within sufficient coverage of the second PLMN may instead opt to be served by the first PLMN, in which case the given UE is said to be "roaming" in the first PLMN. The second wireless service provider may also provide reciprocal roaming service to UEs that subscribe to service of the first PLMN.

Focusing again on LTE, each coverage area of a base station, such as the eNodeB 112, may operate on one or more RF carriers (or carrier bands) spanning 1.4 MHz, 3 MHz, 5 MHz, 10 MHz, 15 MHz, or 20 MHz of electromagnetic spectrum. On each such carrier used for downlink communications, the air interface then defines a Physical Downlink Shared Channel (PDSCH) as a primary channel for carrying data from the base station to UEs, and a Physical Downlink Control Channel (PDCCH) for carrying control signaling from the base station to UEs. Further, on each such carrier used for uplink communications, the air interface defines a Physical Uplink Shared Channel (PUSCH) as a primary channel for carrying data from UEs to the base station, and a Physical Uplink Control Channel (PUCCH) for carrying control signaling from UEs to the base station.

Under LTE, downlink and uplink air interface resources are mapped in the time domain and in the frequency domain. In the time domain, the air interface may be divided into a continuum of 10 millisecond (ms) frames, with each frame being further divided into ten 1-ms subframes that are in turn each divided into two 0.5-ms slots. Thus, each frame has 10 subframes, and each subframe has 2 slots; the 1-ms duration of a subframe also defines a "transmission time interval" (TTI). Slots are each further sub-divided into a number (typically 7) of modulation intervals, or "symbol times." In the frequency domain, data for transmission during each symbol time are jointly modulated over a sequence of sub-carriers that span the bandwidth of the carrier, using orthogonal frequency division multiplexing (OFDM) to form one OFDM symbol per symbol time. Each OFDM symbol thus corresponds to a frequency superposition of modulated data symbols, which are further organized in frequency into groups, each group spanning 12 contiguous sub-carriers. Each sub-carrier is 15 kHz wide, so each group of 12 sub-carriers occupies a 180 kHz bandwidth.

LTE further defines a particular grouping of resources arrayed across one subframe (1 ms) in the time-domain and 12 sub-carriers in the frequency-domain as a "resource block." Typically, the 1-ms duration of a resource block contains 14 symbol times accommodating 14 OFDM symbols, each spanning 66.7 microseconds (µs) plus a 4.69 µs guard band (cyclic prefix) added to help avoid inter-symbol interference. Thus, each resource block contains 14 OFDM symbols by 12 sub-carriers, thereby constituting an array of 168 "resource elements." Depending on the bandwidth of the carrier, the air interface may support transmission on a number N of such resource blocks in each subframe. For instance, a 5 MHz carrier supports N=25 resource blocks in each 1-ms subframe, whereas a 20 MHz carrier supports N=100 resource blocks in each 1-ms subframe.

A resource element is to the smallest unit of resource allocated on the LTE air interface. Each resource element corresponds to one modulated data symbol on one sub-carrier during one symbol time. As noted, a resource block that consists of 12 sub-carriers and 14 OFDM symbols has 168 resource elements. Each modulated symbol, and thus each resource element, can represent a number of bits, with the number of bits depending on the modulation scheme used. For instance, with Quadrature Phase Shift Keying (QPSK) modulation, each modulation symbol may represent 2 bits; with 16 Quadrature Amplitude Modulation (16QAM), each modulation symbol may represent 4 bits; and with 64QAM, each modulation symbol may represent 6 bits. The frequency superposition of all modulation symbols during a given symbol time and across all sub-carriers of a given carrier band corresponds to one OFDM symbol.

Within a resource block, different resource elements can serve different functions. For instance, on the downlink, certain resource elements across the bandwidth may be reserved to define a physical downlink control channel (PDCCH) for carrying control signals such as page messages and resource allocations from the eNodeB to UEs, and other resource elements may be reserved to define a physical downlink shared channel (PDSCH) that the eNodeB can allocate to carry transmissions to particular UEs on an as-needed basis. Likewise, on the uplink, certain resource elements across the bandwidth may be reserved to define a physical uplink control channel (PUCCH) for carrying control signals such as scheduling requests from UEs to the eNodeB, and other resource elements may be reserved to define a physical uplink shared channel (PUSCH) that the eNodeB can allocate to carry transmissions from particular UEs on an as-needed basis.

In practice, the PUCCH may define various periodically occurring "scheduling request opportunities" in which a UE, such as UE 116, may transmit scheduling requests to an eNodeB, such as the eNodeB 112. For instance, each scheduling request opportunity for the UE may be a particular resource element on the PUCCH, occurring every fourth transmission TTI (i.e., every 4 ms) or the like. Optimally, the eNodeB would signal to the UE to inform the UE which scheduling request opportunities are for the UE. Thus, the UE can transmit a scheduling request to the eNodeB by simply transmitting a 1-bit or other predefined bit in one of its scheduling opportunities, and the eNodeB may thus monitor the PUCCH for such a scheduling request from the UE.

Upon receipt of scheduling request from the UE, the eNodeB may then schedule uplink transmission by the UE. In particular, the eNodeB may generate and transmit to the UE on the PDCCH "downlink control information" (DCI) that specifies scheduling information in a manner sufficient to inform the UE what resources on the PUSCH the UE should use for transmitting data to the eNodeB. For instance, the DCI may designate particular resource blocks in which the UE may transmit on the PUSCH. In practice, this allocation may be for a TTI that is some predefined time period after the TTI in which the UE sent the scheduling request, such as a TTI that is 4 milliseconds later. Thus, if the UE sends a scheduling request in a particular TTI, then the resource allocation that the UE receives in response to that request may be for resources in a TTI that occurs 4 milliseconds later.

Figure 2A:
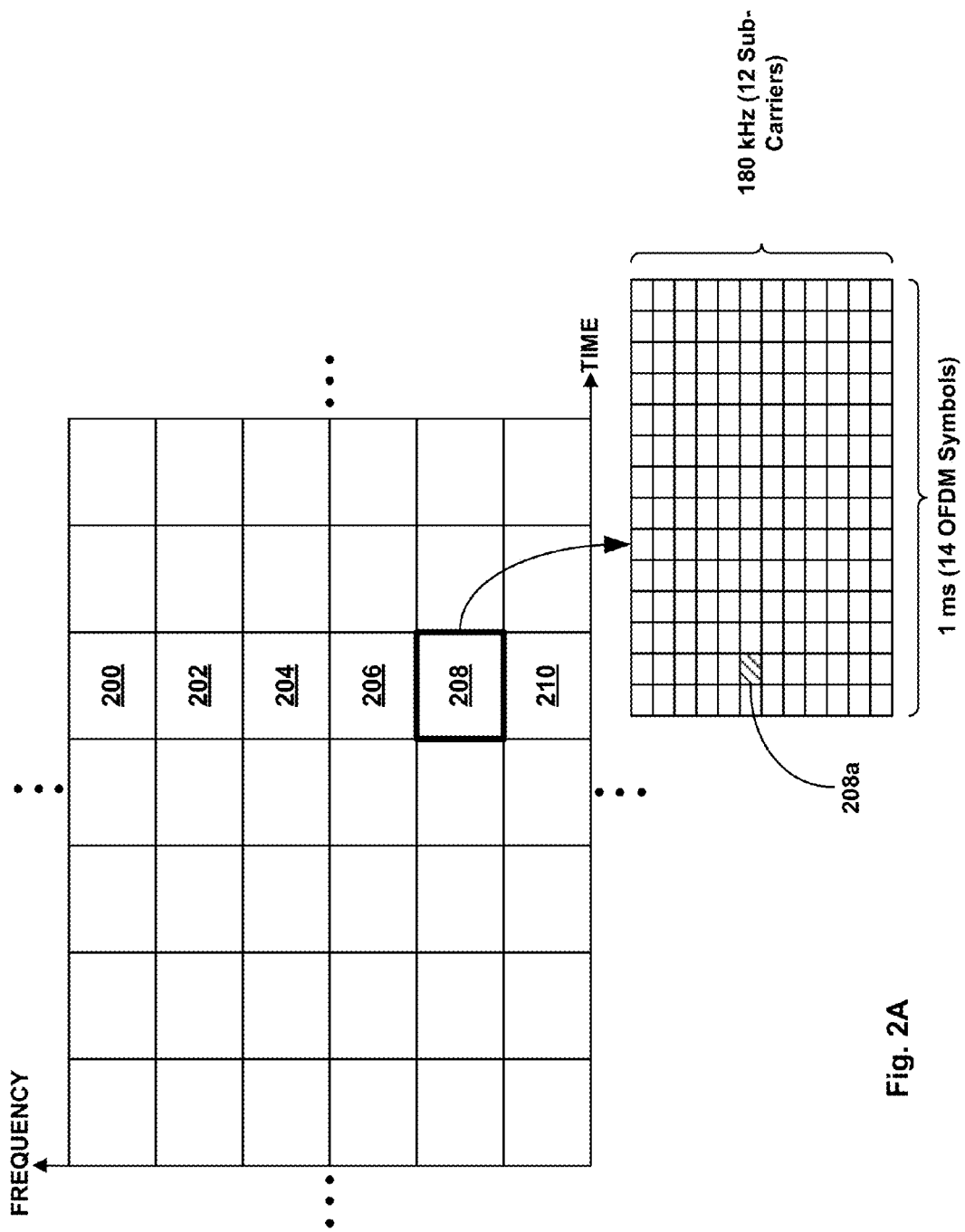
FIG. 2A is a conceptual illustration of a division of a shared communication link into resource blocks, in accordance with an example embodiment.

FIG. 2A illustrates how the resources in a given wireless coverage area may be divided in time and frequency domains into resource blocks under LTE. In the time domain, each resource block occupies a 1-ms subframe. By way of example, FIG. 2A shows resource blocks 200-210 for a portion of a subframe. In the frequency domain, each of the resource blocks 200-210 occupies a respective portion of frequency bandwidth, typically 180 kHz. For purposes of illustration, FIG. 2A shows resource blocks across just six subframes in time and six 12-sub-carrier groupings in frequency. However, as noted above, each LTE frame typically has 10 subframes, while the number of resource blocks spanning frequency depends on the bandwidth of the carrier. For instance, in a 5 MHz LTE carrier, a total of 25 resource blocks may span frequency during each 1 ms subframe. Horizontal and vertical ellipses in the figure represent additional resource blocks in the time and frequency dimensions.

FIG. 2A also includes a more detailed view of resource block 208, illustrating resource elements arrayed in time and frequency. This detailed view shows that the 180 kHz of frequency bandwidth corresponds to 12 sub-carriers of 15 kHz each, and also shows that the 1 ms subframe corresponds to the duration of 14 OFDM symbols (although a different number of OFDM symbols per resource block can be used). As noted above, each resource element corresponds to a modulated sub-carrier symbol that is carried on a particular sub-carrier for the duration of one symbol time.

Figure 2B:
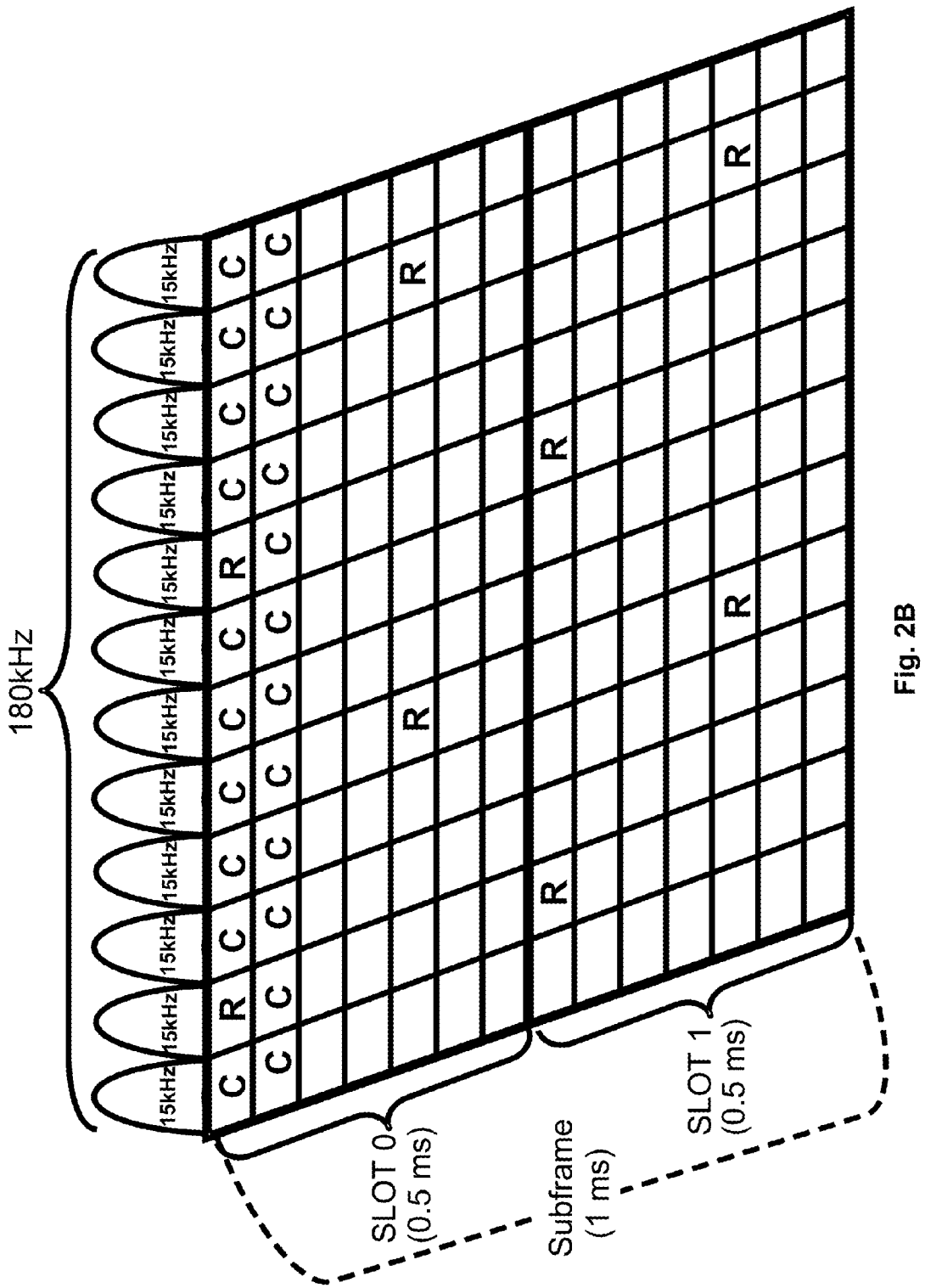
FIG. 2B is a conceptual illustration of a resource block, in accordance with an example embodiment.

The use of different resource elements for different purpose is illustrated by way of example for a downlink resource block in FIG. 2B. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (including for instance the PDCCH). The other 138 resource elements that are unlabeled can be used to define the PDSCH for transmitting bearer data and other scheduled transmissions. It is to be understood that FIG. 2B illustrates only one possible configuration, and that a resource block could have other configurations as well.

In LTE as currently defined, a physical control format indicator channel (PCFICH) carries signaling overhead information such as an indication of how many 67 μs time segments are being used for control signaling. Additionally, each PDCCH provides UE-specific control information within a number of control channel elements (CCE), each of which is provided as nine resource element groups (REG), with each REG being four resource elements, mapping four quadrature phase shift keying (QPSK) symbols, for a total of 36 QPSK symbols per CCE. The CCEs are numbered with identifiers, and a base station may allocate particular CCEs to particular UEs by specifying the allocations in the PCFICH, with reference to CCE IDs and UE IDs.

Within the electromagnetic spectrum, and the RF portion of the spectrum in particular, different wireless service providers may be allocated different, non-overlapping carrier bands for providing wireless services. Under LTE, carriers are allocated to service providers in different RF ranges and in non-overlapping bands of 1.4 MHz, 3 MHz, 5 MHz, 10 MHz, 15 MHz, and/or 20 MHz. Some service providers may have more than one carrier band allocation. Contiguous groupings of carriers can be further organized in frequency within different specified "band channels" used to sub-divide the RF spectrum at a higher level than individual carriers.

Any given carrier (or carrier band) can be characterized by a minimum frequency and a maximum frequency, such that the carrier bandwidth is just the difference between the maximum and minimum frequencies. The maximum and minimum frequencies can also be considered as defining band "edges." The carrier bandwidth is sub-divided into K sub-carriers, each 15 kHz wide, where N 12-sub-carrier groupings then make up N 180-kHz-wide resource blocks of the carrier. In practice, the total bandwidth of any given LTE carrier is somewhat wider than the N×180 kHz of its N resource blocks. For example, a 20 MHz carrier band has N=100 resource blocks for a total utilized bandwidth of 18 MHz out of the 20 MHz available. As another example, a 10 MHz carrier band has N=50 resource blocks for a total utilized bandwidth of 9 MHz out of the 10 MHz available. Under LTE, the unutilized bandwidth—i.e., bandwidth of sub-carriers that are not included in any of the N resource blocks—is configured in two guard bands, one at each band edge. That is, one guard band occupies spectrum between the first resource block and a first band edge, and the other guard band occupies spectrum between the last resource block and the second band edge.

Within a given band channel, carriers are arranged contiguously in frequency, such that any two adjacent carriers are separated by a common band edge. One consequence of this arrangement is that transmission power near the edge of one carrier can "leak" into the adjacent carrier across the common edge between the two carriers. Such power leakage can result in interference and correspondingly some degree of service degradation. The impact of power leakage across band edges can be mitigated to some extent by the guard bands at the band edges, which serve as buffers of nominally power-free spectrum. But power leakage can still be problematic depending, for example, on the transmission power level being used on the sub-carriers of the resource blocks—particularly those resource blocks nearest the band edges.

Figure 2C:
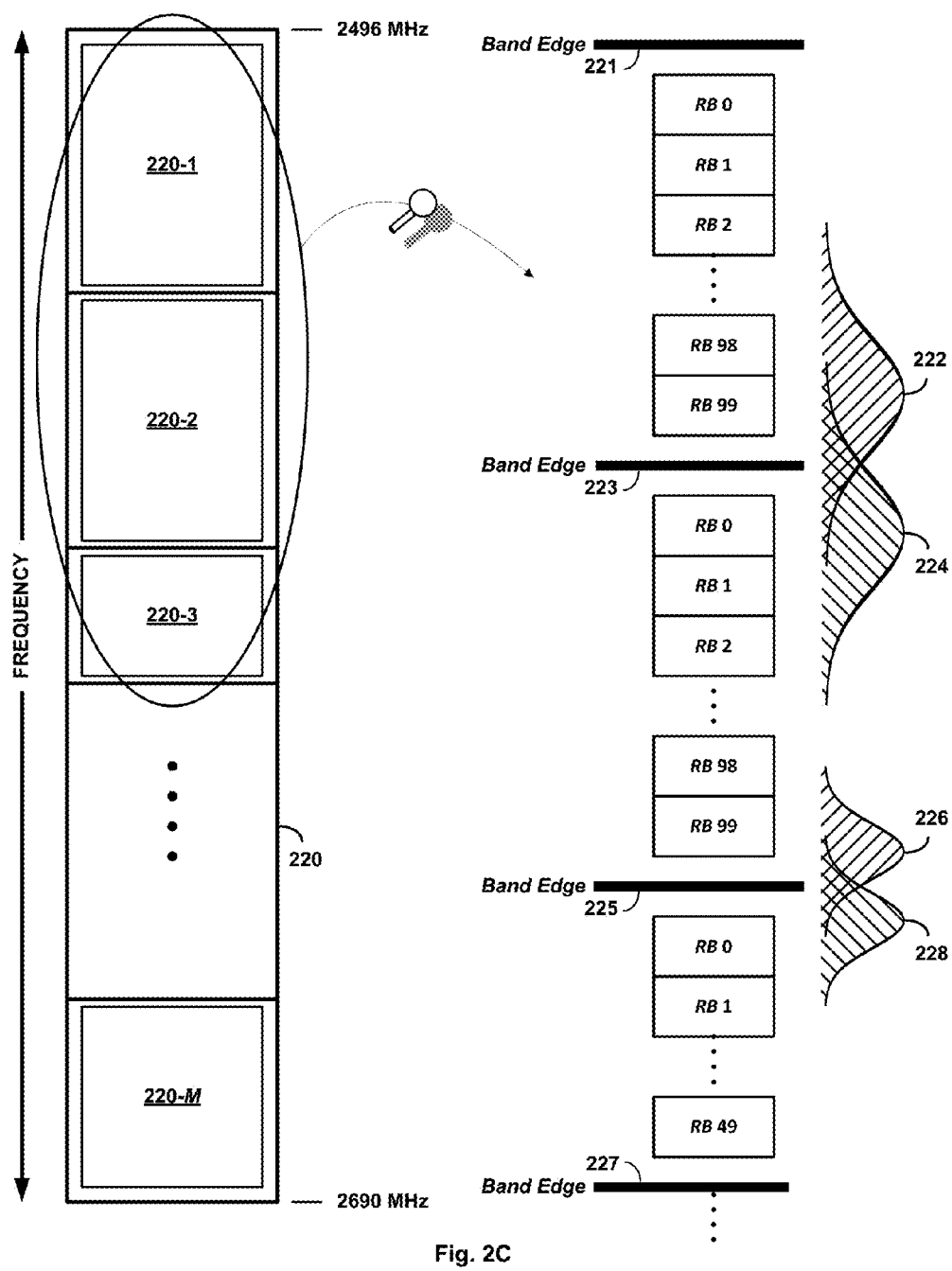
FIG. 2C is a conceptual illustration of wireless carrier bands of a band channel, in accordance with an example embodiment.

FIG. 2C is a conceptual illustration of wireless carrier bands of a band channel, band edges, and cross-carrier power leakage. The left side of FIG. 2C shows, by way of example, a band channel 220 spanning frequencies 2,496 MHz to 2,690 MHz, for a total of 194 MHz. Within the band channel 220, four representative carriers 220-1, 220-2, 220-3, and 220-M are shown. Vertical ellipses between carriers 220-3 and 220-M represent additional carriers not expressly shown in FIG. 2C. The right side of FIG. 2C shows an expanded view of the first three carriers 220-1, 220-2, and 220-3, depicting representative resource blocks in each carrier, as well as conceptually marking band edges. Specifically, a band edge 221 marks the minimum frequency of the carrier 220-1, which, by way of example, is also a lower-frequency boundary of the band channel 220. A band edge 223 marks a common boundary between the maximum frequency of the carrier 220-1 and the minimum frequency of the carrier 220-2. Similarly, a band edge 225 marks a common boundary between the maximum frequency of the carrier 220-2 and the minimum frequency of the carrier 220-3; and a band edge 227 marks a common boundary between the maximum frequency of the carrier 220-3 and the minimum frequency of the next (but unspecified) carrier (represented by vertical ellipses beneath the band edge 227).

Also by way of example in FIG. 2C, the carrier 220-1 has a bandwidth of 20 MHz, as signified by the 100 resource blocks numbered RB 0, RB 1, RB 2, . . . , RB 98, RB 99, where the ellipses represent 95 resource blocks between RB 2 and RB 98 that are not expressly shown for the sake of brevity in the figure. Similarly, the carrier 220-2 also has a bandwidth of 20 MHz, again as signified by the 100 resource blocks numbered RB 0, RB 1, RB 2, . . . , RB 98, RB 99. The carrier 220-3 has, by way of example, a bandwidth of 10 MHz, as signified by the 50 resource blocks numbered RB 0, RB 1 . . . , RB 49.

Power leakage between carriers is represented to the right of the displayed resource blocks by conceptual graphical plots of power as a function of frequency. In the example illustration, a power plot 222 represents transmission power originating in one or more sub-carriers of the carrier 220-1. Similarly, a power plot 224 represents transmission power originating in one or more sub-carriers of the carrier 220-2. As a visual cue, the two plots are shaded with oppositely-slanted hatch marks. Power leakage is represented by a region where the plots overlap, depicted with slanted cross-hatching in the figure. It should be understood that the form of the illustration in FIG. 2C is conceptual, and that any apparent symmetry of cross-carrier leakage is not necessarily intended to imply or suggest such symmetry in practice.

A similar conceptual representation of power leakage is illustrated with partially overlapping power plots 226 and 228 near the band edge 225 between the carriers 220-2 and 220-3. Namely, in the overlap region of the power plots 226 and 228, at least some of the power in the carrier 220-2 near the band edge 225 originates from sub-carriers in the carrier 220-3; and in the overlap region, at least some of the power in the carrier 220-3 near the band edge 225 originates from sub-carriers in the carrier 220-2.

In the context of RF spectrum management, power leakage from one defined band to another is sometimes referred to as "out of band emission," or "OOBE," and one metric applied to leakage across channel boundaries is an "adjacent channel leakage ratio," or "ACLR." In principle, power leakage across carrier band edges can occur on both the downlink and the uplink, and one or more conventional techniques may be implemented in a wireless communication system to help control or reduce leakage and/or its effects. For example, a wireless service provider may manage power leakage issues on the downlink by deployment planning of eNodeBs, as well as implementing inter-base-station communications aimed at controlling and/or minimizing interference. On the uplink, UEs may be configured to modify or adapt their respective transmission powers in response to one or more control messages to do so from a serving eNodeB. In addition to operational procedures specified by one or another standard, OOBE and/or ACLR may also be subject to regulatory control. For instance, in the United States, the Federal Communications Commission (FCC) dictates OOBE levels that must not be exceeded, without the FCC necessarily prescribing how to achieve compliance.

Under LTE, one approach to controlling OOBE and ACLR on the uplink is to cause UEs in the coverage area of an eNodeB to reduce their respective transmission powers in accordance with one or more directives from the eNodeB. More particularly, LTE defines a "maximum power reduction" ("MPR") value that prescribes one or more default power levels that a UE may use in transmission. In order to meet additional ACLR and regulatory spectrum emission requirements, LTE also defines "additional maximum power reduction" ("A-MPR") values that UEs may be directed to apply in order to further reduce transmission power when necessary. Typically, A-MPR values specify a power attenuation value in logarithmic units of decibels (dB) relative to their current level, where any two power levels $P_0$ and $P_1$ are related by x dB=$10 \log_{10}(P_1/P_0)$. For example, attenuation by 3 dB corresponds to power reduction by ½ (i.e., reduction by a factor of two).

An eNodeB may use different "uplink-attenuation parameters" to specify different attenuation levels that served UEs should apply to their uplinks power. For example, under LTE, uplink-attenuation parameters are referred to as "network signaling" ("NS") values. More specifically, an eNodeB can broadcast one of two NS values to UEs in its coverage area to indicate whether the UEs should use the default MPR or apply the A-MPR. The NS values can thus serve to define OOBE levels that UEs must meet, and to define A-MPR values to apply in order to meet the required OOBE levels.

By way of example, LTE defines "NS_01" to signify default MPR for all bands and bandwidths, and defines "NS_04" to signify specific attenuation values of A-MPR for the band channel 220 spanning frequencies 2,496 MHz to 2,690 MHz illustrated in FIG. 2C. The actual amount of attenuation applied (in dB) by a UE that receives NS_04 is typically determined by the UE based on which uplink air interface resources the UE has been allocated for upcoming transmissions to the eNodeB. Values other than NS_04 for signifying A-MPR may apply to other band channels. Thus, the principles of operation described herein are not limited to just the 2,496 MHz to 2,690 MHz band channel, but can be applied to specifying A-MPR in any band channel or other spectral range.

While use of an A-MPR can help cause UEs to meet OOBE levels, reduced uplink transmission power can also reduce the effective size of an eNodeB's coverage area, at least for uplink communications. As a result, when UE that hands over from a serving (source) eNodeB using NS_01 to a target eNodeB using NS_04, the UE may be served by a smaller uplink coverage area after the handover. Thus although a handover may be triggered by conditions indicating better (e.g., expanded) downlink coverage from a target eNodeB, the handover could actually result in degraded uplink coverage if the UE is directed to increase its uplink attenuation. Under conventional operation, a possible change in uplink attenuation is not factored into a decision of whether or not to handover. Accordingly, example embodiments herein provide a method and system for accounting for network signaling values used by a source and one or more target base stations in making a handover decision.

Figure 3:
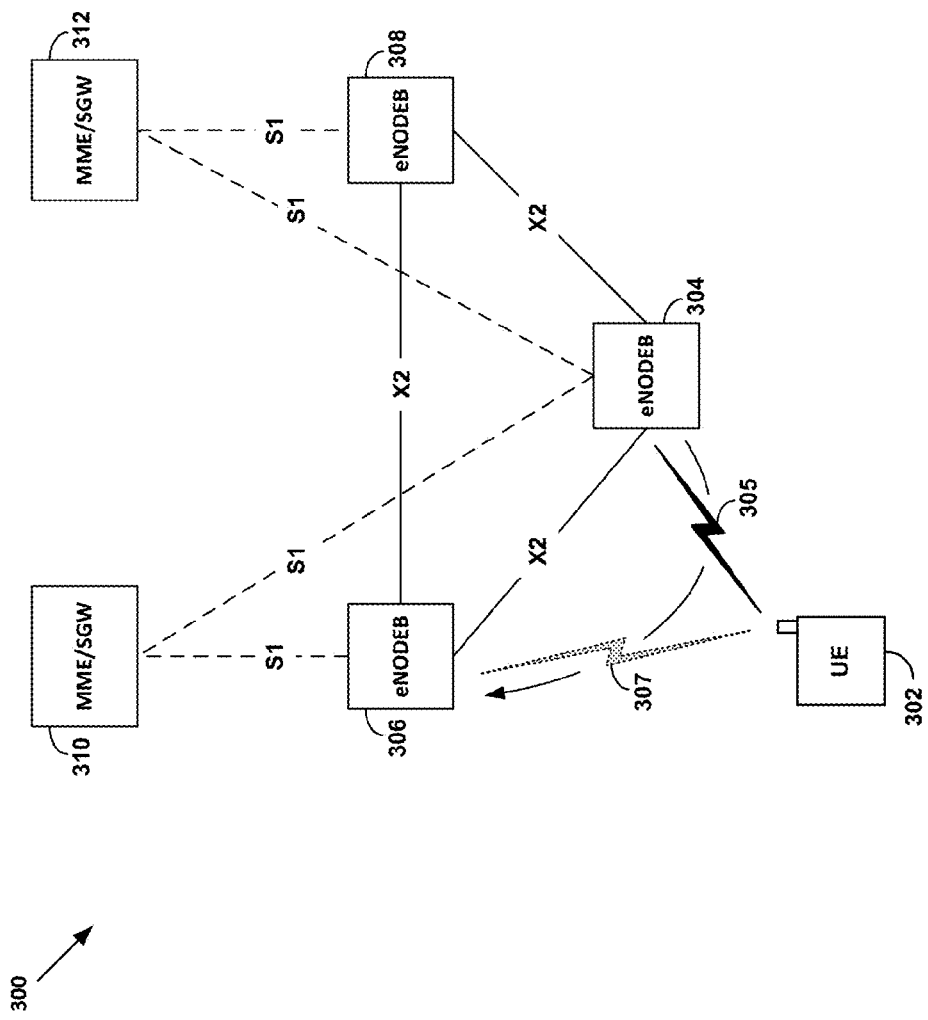
FIG. 3 is a simplified block diagram of aspects of a wireless communication system relating to handover, in accordance with an example embodiment.

FIG. 3 is a simplified block diagram of aspects of an example wireless communication system 300 relating to handover. By way of example, the system 300 includes eNodeBs 304, 306 and 308, each communicatively connected to one another by respective "X3" interfaces. The system 300 also includes an MME/SGW 310 and 312, each of which could correspond to merged functionality of the MME 118 and SGW 120 in FIG. 1, for example. The eNodeB 306 is communicatively connected to the MME/SGW 310 by one "S1" interface, and the eNodeB 308 is communicatively connected to the MME/SGW 312 by another "S1" interface. The eNodeB 304 is communicatively connected to both MME/SGW 310 and MME/SGW 312 by respective "S1" interfaces. It will be appreciated that the arrangement of network elements as described in the system 300 is illustrative, and that other arrangements are possible as well. Further, the system 300 can include other elements and network entities that are not necessarily shown in FIG. 3. In particular, there can be additional eNodeBs.

For purposes of illustration, an example handover of a UE 302 from the eNodeB 305 to the eNodeB 306 is also depicted in FIG. 3. As indicated, the UE 302 has an air interface connection 305 with the eNodeB 304. A potential air interface connection 307, represented as a dashed lightning bolt, with the eNodeB 306 indicates that the eNodeB 306 will be serving the UE 302 as a result of the handover. A curved arrow from the eNodeb 304 to the eNodeB 306 represents the handover. Thus, the eNodeB 304 is initially the serving (source) base station, and the eNodeB 306 is initially a target base station. It is possible that the eNodeB 308 is also a target base station before the handover; in this example, the eNodeB 306 is evidently deemed a better target than the eNodeB 308. Under conventional LTE operation, the criteria for selecting one of possible multiple target base stations for handover do not include considerations of network signaling values used by the target base stations. Before describing example embodiments that do account for network signaling values used by the target base stations, it is useful to briefly explain examples of conventional handover operation.

In general, a handover entails some form of monitoring by a UE of downlink power from two or more base stations, where at least one of the monitored base stations is UE's serving base station and the others are possible target base stations. Monitoring usually involves the UE measuring downlink power on a specific channel, such as the pilot of the one or more base stations. The UE may report its observed downlink power measurements to its serving base station from time to time, either periodically or as triggered by a threshold condition, for example. The serving base station can then determine whether or not to initiate a handover, and, if so, to which target base station.

More particularly, LTE provides procedures by which a UE is instructed by its serving eNodeB to begin monitoring downlink power and to report to the eNodeB on an event-triggered basis when one or more threshold conditions is met. The threshold conditions typically include one or more power levels against which the measured downlink powers are compared by the UE. The serving eNodeB can set the threshold levels in its instruction the UE to begin monitoring for one or more events. In the triggered procedures, the UE sends a reporting message to its serving eNodeB only when the UE detects one of the qualifying trigger events. The UE's reporting message typically identifies one or more target eNodeBs that meet the criteria for the event trigger(s) and includes the downlink power measured by the UE of each target eNodeB. Each target eNodeB then represents a "potential" handover, in the sense that any one of them qualifies as a handover target. The serving eNodeB can then determine an appropriate handover action, including whether to initiate a handover to one of the target eNodeBs. Two LTE handover events serve to illustrate how possible changes in uplink attenuation resulting from handover can be taken into account in handover procedures, in accordance with example embodiments. The two LTE handover events described below, in somewhat simplified terms, are referred to as the "A3" event and the "A4" event.

The basic condition of the A3 trigger event is that the downlink power measured by the UE of one or more neighboring eNodeBs is above that of the serving eNodeB by at least a "target offset." In more specific detail, the A3 event is deemed to have occurred when the A3 condition is satisfied for a defined length of time. In addition, in order to compensate for various operational factors, the UE may add or subtract one or another compensating offset to or from the measured downlink power levels of the serving eNodeB and of the neighboring eNodeBs prior to testing for whether the condition is met. The target offset can be set by the serving eNodeB, for example. The time duration and compensating offsets can also be set by the serving eNodeB. Neighboring eNodeBs that satisfy the A3 condition can then be considered target eNodeBs; i.e., eNodeBs to which a handover may be appropriate.

When a UE determines that the A3 trigger event has occurred, it sends a reference signal received power (RSRP) message to its serving eNodeB. The RSRP message includes the downlink power measured by the UE of the serving eNodeB and of one or more target eNodeBs. The serving eNodeB then determines whether to initiate handover to one of the targets. Under conventional operation, the determination does not account for whether the UE will be directed to change its uplink attenuation as a result of handing over to any of the targets.

The basic condition of the A4 trigger event is that the downlink power measured by the UE of one or more neighboring eNodeBs is above a "target threshold" level. In more specific detail, the A4 event is deemed to have occurred when the A4 condition is satisfied for a defined length of time. In addition, in order to compensate for various operational factors, the UE may add or subtract one or another compensating offset to or from the measured downlink power level of the neighboring eNodeBs prior to testing for whether the conditions are met. As with the A3 event, the target threshold in the A4 event, as well as the time duration and offsets, can be set by the serving eNodeB. Neighboring eNodeBs that satisfy the A4 condition can then be considered target eNodeBs; i.e., eNodeBs to which a handover may be appropriate.

When a UE determines that the A4 trigger event has occurred, it sends a RSRP message to its serving eNodeB. The serving eNodeB then determines whether to initiate handover to one of the targets. As with conventional operation in the A3 event, the determination of handover triggered by an A4 event does not account for whether the UE will be directed to change its uplink attenuation as a result of handing over to any of the targets.

As noted above, under conventional operation, a serving eNodeB makes a handover decision based on an A3 event or an A4 event without consideration of the network signaling values being used by any of the one or more target eNodeBs. As a result, a UE that is directed to handover from its serving (source) eNodeB to a given target eNodeB may be directed by the given target eNodeB to change the amount of attenuation the UE applies to its uplink transmission power. For example, if the serving eNodeB is using NS_01 and the given target eNodeB is using NS_04, then the UE will be directed to increase its uplink attenuation. This could result in degradation of an existing call or communication session, including interruption or even dropping. On the other hand, if the serving eNodeB is using NS_04 and one or more targets are using a mix of NS_01 and NS_04, the UE might obtain better overall service (downlink and uplink) from a target using NS_01 even if that target doesn't have the highest downlink power measured by the UE from among all the available target eNodeBs. These are just a few of the possible handover scenarios in which changes in uplink attenuation that can impact post-handover service are not accounted for in conventional operation.

In accordance with example embodiments, possible changes in the amount of attenuation a UE applies to its uplink as a result of handover can be accounted for as part of the handover procedure by arranging for source and target eNodeBs to exchange respective network signaling values before (or as part of) making handover decisions. More generally, base stations may use "uplink attenuation parameters" to encode or signify how much attenuation their respectively served UEs should be directed to apply to uplink transmission power. In the context of LTE, for example, the base stations can be eNodeBs and the uplink attenuation parameters can be network signaling values, such as NS_01 and NS_04. When a serving eNodeB determines that a handover condition is met, such occurrence of an A3 or A4 event, the serving eNodeB can communicate with each of the target eNodeBs indicated in a RSRP message in order to learn their respective network signaling values. For example, the serving eNodeB can query each target eNodeB via a respective X2 interface connection. Additionally or alternatively, the serving eNodeB can query each target eNodeB over its S1 connection to a common MME/SGW. Or the serving eNodeB can use both is X2 and S1 interfaces, depending on its respective connections to the target eNodeBs. The serving eNodeB can then compare the network signaling values of each of the targets with its own network signaling value, and incorporate the comparison results in its determination of which, if any, of the target eNodeBs the UE should hand over to.

The specific logic of a handover decision can take variety specific forms, each depending on the handover condition (e.g., A3 or A4) and each incorporating a comparison of the serving eNodeB's network signaling value with that of each of the target eNodeBs, as well the downlink power of the serving and target eNodeBs as measured by the UE, and one or more threshold and offset. In particular, by comparing the respective network signaling value of each of the target eNodeBs with its own, the serving base station can determine what impact each potential handover will have on the UE's uplink attenuation; that is, whether each potential handover will result in an increase, decrease, or no change in the UE's uplink attenuation. The serving eNodeB can then reevaluate the conventional handover condition based, at least in part, on the determined potential change in uplink attenuation. For purposes of the discussion herein, the term "change in the UE's uplink attenuation" will be generalized to include all three possibilities of increase, decrease, and no change (where "no change" can be considered mathematically as "change=0").

For purposes of illustration, two specific examples of handover decision logic for an LTE system are described below, one each for the A3 and A4 events. The two examples are not intended to be limiting, and there could be modifications to the steps and criteria used, while still remaining within the scope and spirit of example embodiments herein. In accordance with example embodiments, the handover decision logic described for each of the use cases below can be implemented as machine instructions executable by one or more processors of a base station, such as an eNodeB. The instructions can be stored on one or another form or non-transitory computer-readable medium (e.g., solid state memory, magnetic disk, etc.).

FIGS. 4A-4D present conceptual depictions of an example method of accounting for network signaling values in handover decisions applied in four illustrative use cases involving the A3 event. Each figure shows a bar graph representing downlink power measured by a UE of a serving eNodeB ("Serving eNB") as a vertical gray bar and of each of three target eNodeBs ("N1," "N2," and "N3") as vertical white bars. The serving eNodeB's downlink power is also marked on a vertical axis, and a horizontal line demarks a "serving threshold" used in reevaluating the A3 condition. The downlink power of N1, the target having the least downlink power, is shown to be at least a target offset above that of the serving eNodeB; by extension, N2 and N3 also satisfy this condition. In each use case, the logic considers the mix of network signaling values being used by the serving and target eNodeBs, and how close the measured downlink power of the serving eNodeB is to the serving threshold.

Figure 4A:
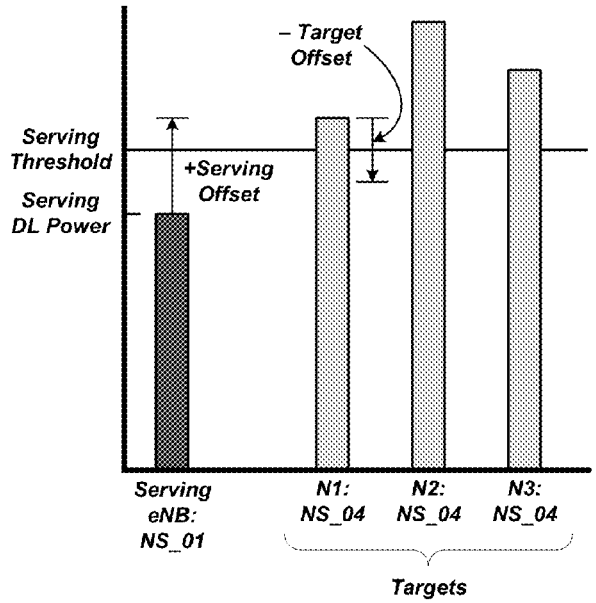
FIG. 4A is a conceptual depiction of an example method of accounting for network signaling values in handover decisions applied in an illustrative use case, in accordance with an example embodiment.
Figure 4B:
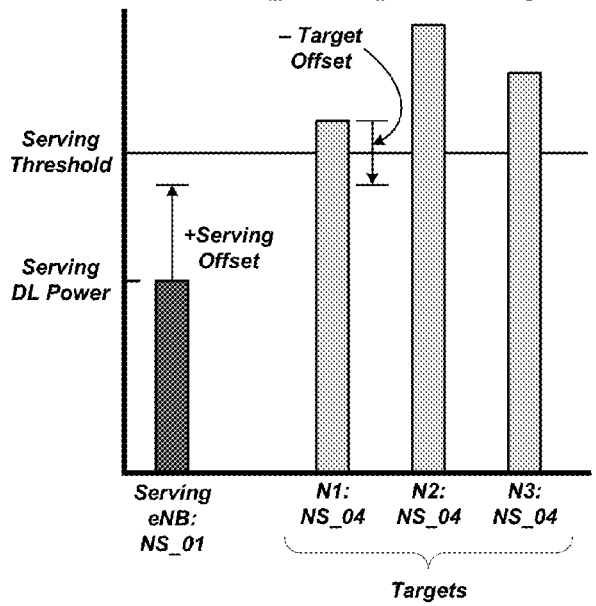
FIG. 4B is a conceptual depiction of an example method of accounting for network signaling values in handover decisions applied in another illustrative use case, in accordance with an example embodiment.

More particularly, FIGS. 4A and 4B show A3 use cases in which the serving eNodeB is using NS_01 and each of three target eNodeBs is using NS_04. In both cases, a handover to any of the target eNodeBs will therefore result in the UE being directed to increase its uplink power. The handover decision logic then leads to a decision of whether to handover to one of the target eNodeBs based on whether or not the downlink power of the serving eNodeB measured by the UE is below the serving threshold by more than a "serving offset" amount. In accordance with example embodiments, the serving eNodeB could add the serving offset to the UE's measurement of the eNodeB's downlink power, and compare the result to the serving threshold. By way of example, the serving offset could be 2 dB, although other values could be used as well. The two use cases of FIGS. 4A and 4B can then be distinguished by the result of the comparison.

FIG. 4A illustrates the use case in which the downlink power of the serving eNodeB measured by the UE is not below the serving threshold by more than the serving offset. Put another way (and as shown), the downlink power of the serving eNodeB plus the serving offset is greater than or equal to the serving threshold. In this use case, the serving eNodeB does not handover the UE to any of target eNodeBs, but instead continues to serve the UE, even though the A3 event has occurred. A table to the right of the bar graph summarizes the handover decision. A rationale for the decision not to handover in this case (illustrated in FIG. 4A) is that the serving eNodeB's downlink power is not "very far" below the serving threshold. At the same time, a handover is guaranteed to cause the UE to increase its uplink attenuation, and therefore have degraded uplink service with any chosen target eNodeB. In this use case then, the tradeoff of increased downlink power is deemed not "worth" the degradation in uplink power.

FIG. 4B illustrates the use case in which the downlink power of the serving eNodeB measured by the UE is below the serving threshold by more than the serving offset. Put another way (and as shown), the downlink power of the serving eNodeB plus the serving offset is less than the serving threshold. In this use case, the serving eNodeB hands over the UE to the target eNodeBs having the highest downlink power as measured by the UE. A table to the right of the bar graph again summarizes the handover decision. A rationale for the decision to handover in this case is that the serving eNodeB's downlink power is sufficiently below the serving threshold to make a handover warranted just on the basis of this alone. Thus, the handover is made to the best target eNodeB—e.g., the one measured by the UE to have the highest downlink power. In the example illustrated, the UE would handover to the target N2.

Figure 4C:
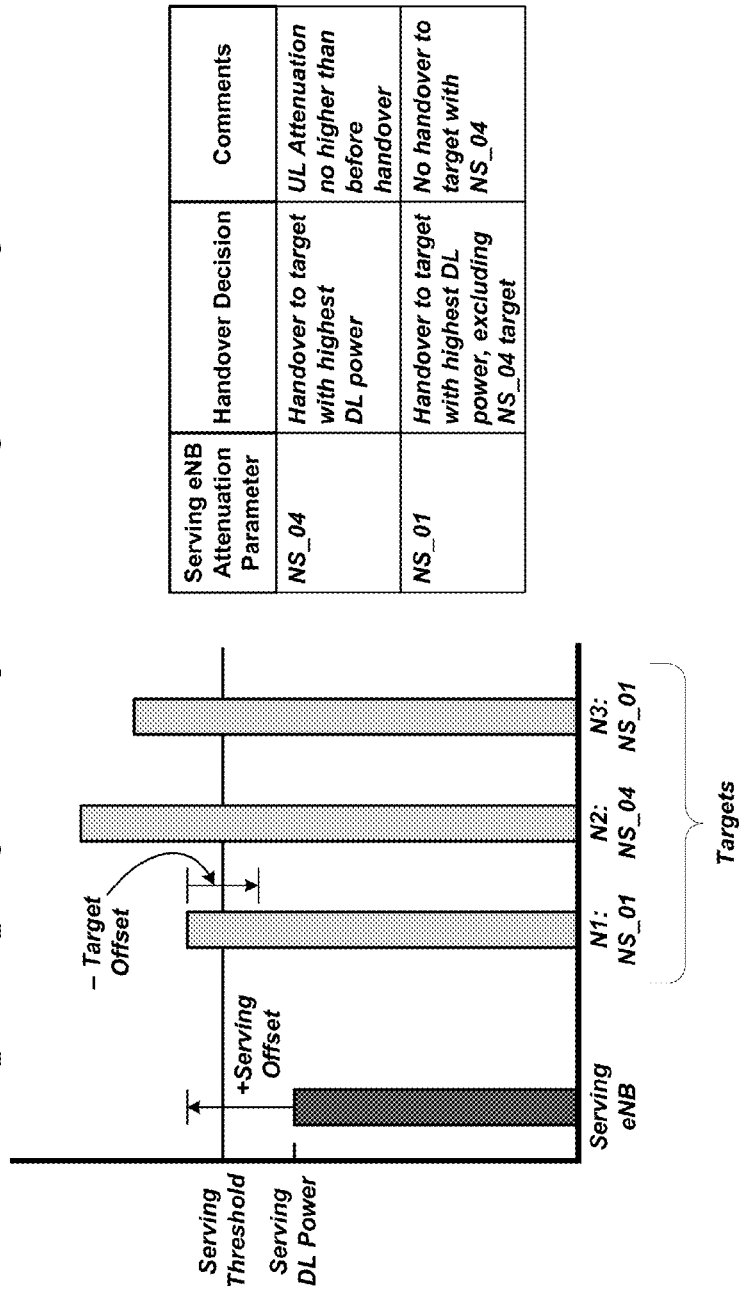
FIG. 4C is a conceptual depiction of an example method of accounting for network signaling values in handover decisions applied in yet another illustrative use case, in accordance with an example embodiment.
Figure 4D:
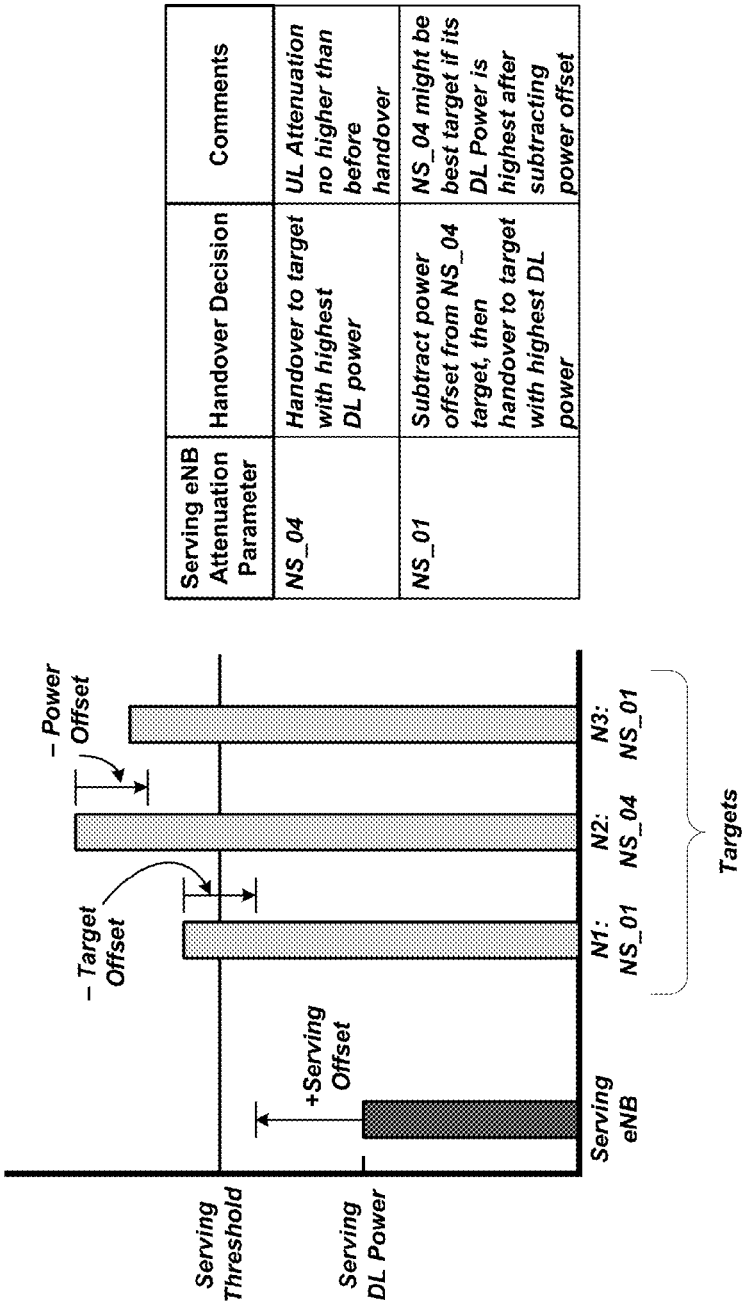
FIG. 4D is a conceptual depiction of an example method of accounting for network signaling values in handover decisions applied in still another illustrative use case, in accordance with an example embodiment.

FIGS. 4C and 4D show A3 use cases in which the serving eNodeB is using either NS_01 or NS_04 and the three target eNodeBs are using a mix of NS_01 and NS_04. By way of example, N1 and N3 are each using NS_01 and N2 is using NS_04. Other mixes of NS_01 and NS_04 among eNodeBs can also fit this example use case. For each of these two use cases, a handover of the UE will result in an increase, decrease, or no change in uplink attenuation depending on whether the serving eNodeB is using NS_01 or NS_04, and which target eNodeB is considered. Again, the handover decision logic leads to a decision of whether to handover to one the target eNodeB based on whether or not the downlink power of the serving eNodeB measured by the UE is below the serving threshold by more than the serving offset amount. Thus, the serving eNodeB could again add the serving offset to the UE's measurement of the eNodeB's downlink power, and compare the result to the serving threshold. The two use cases of FIGS. 4C and 4D can then be distinguished by the result of the comparison.

FIG. 4C illustrates the use case in which the downlink power of the serving eNodeB measured by the UE is not below the serving threshold by more than the serving offset. If the serving eNodeB is using NS_04, then the decision is made to handover the UE to the best target eNodeB—e.g., the one measured by the UE to have the highest downlink power. Again, this is the target N2 in the illustrated example. A rationale for the decision to handover in this case is that the UE's uplink attenuation will either decrease (e.g., NS_04→NS_01) or remain the same (e.g., NS_04→NS_04) for any possible handover. Thus, there is no expected degradation of uplink service, so the UE should handover to the eNodeB that will provide the best downlink service.

If in the use case of FIG. 4C the serving eNodeB is using NS_01, then a handover will result in either increased uplink attenuation (e.g., NS_01→NS_04) or no change in uplink attenuation (e.g. NS_01→NS_01). The serving eNodeB makes a decision to handover the UE to the best target eNodeB, but excluding any target eNodeB that is using NS_04. In the illustrated example, the UE would handover to the target N3. A rationale for the decision not to handover to any target eNodeB using NS_04 is similar to the rationale in the use case of FIG. 4A. Namely, since the UE's measurement of the serving eNodeB's downlink power is so close to the serving threshold, the tradeoff of increased downlink power is deemed not "worth" the degradation in uplink power that will result from handing over to a target eNodeB using NS_04.

On the other hand, a handover to any target eNodeB using NS_01 will result in no increase in uplink attenuation for the UE. In the illustrated example, the UE will handover to N3, which has (by way of example) the highest measured downlink power among the target eNodeBs using NS_01. The handover decisions for the use case of FIG. 4C are summarized in the table to the right of the bar graph.

FIG. 4D illustrates the use case in which the downlink power of the serving eNodeB measured by the UE is below the serving threshold by more than the serving offset. If the serving eNodeB is using NS_04, then the decision is made to handover the UE to the best target eNodeB—e.g., the one measured by the UE to have the highest downlink power. Again, this is the target N2 in the illustrated example. A rationale for the decision to handover in this case is that the UE's uplink attenuation will either decrease (e.g., NS_04→NS_01) or remain the same (e.g., NS_04→NS_04) for any possible handover. Thus, there is no expected degradation of uplink service, so the UE should handover to the eNodeB that will provide the best downlink service.

If in the use case of FIG. 4D the serving eNodeB is using NS_01, then a handover will result in either increased uplink attenuation (e.g., NS_01→NS_04) or no change in uplink attenuation (e.g. NS_01→NS_01). In this case, the decision is made to handover the UE to the best target eNodeB, after applying a bias against any eNodeB using NS_04. More specifically, a "power offset" is first subtracted from the measured downlink power of any eNodeB using NS_04. Then a target eNodeB having the highest measured downlink power (including the power offset adjustment applied to the power of eNodeB using NS_04) is selected for a handover. In the illustrated example, N2 is using NS_04, so the power offset is first subtract from N2's measured downlink power. The subtraction results in an adjusted measurement for N2 that is, by way of example, below the measured downlink power of N3. Thus, in this example, N3 is selected for the handover. A rationale for this handover decision is that, while the serving eNodeB's downlink power is sufficiently below the serving threshold to warrant a handover, any possible increase in uplink attenuation (e.g., NS_01→NS_04) still results in some degradation of uplink service. Subtracting the power offset (or applying some other type of bias) can help ensure that a target eNodeB using NS_04 will only be selected if its measured downlink power is higher than any target eNodeB using NS_01 by more than the power offset. As seen in this example, subtracting the power offset from the measured downlink power of N2 makes N2 a less desirable choice than N3. The handover decisions for the use case of FIG. 4D are summarized in the table to the right of the bar graph.

FIGS. 5A-5D present conceptual depictions of an example method of accounting for network signaling values in handover decisions applied in four illustrative use cases involving the A4 event. The format of these figures is similar to that of FIGS. 4A-4D. Each figure shows a bar graph representing downlink power measured by a UE of a serving eNodeB ("Serving eNB") as a vertical gray bar and of each of three target eNodeBs ("N1," "N2," and "N3") as vertical white bars. The serving eNodeB's downlink power is also marked on a vertical axis, one horizontal line demarks a serving threshold, and another horizontal line demarks a target threshold. In each use case, the logic considers the mix of network signaling values being used by the serving and target eNodeBs, and how far above the serving threshold the downlink power of the serving eNodeB is measured to be by the UE. Note that in the A4 event, the target threshold need not exceed the measured downlink power of the serving eNodeB; in the examples of FIGS. 5A and 5B, the measured downlink power of the serving eNodeB does not exceed the target threshold, while in the examples of FIGS. 5C and 5D, the measured downlink power of the serving eNodeB does exceed the target threshold. Other circumstances of relative power that satisfy the A4 condition are possible as well.

Figure 5A:
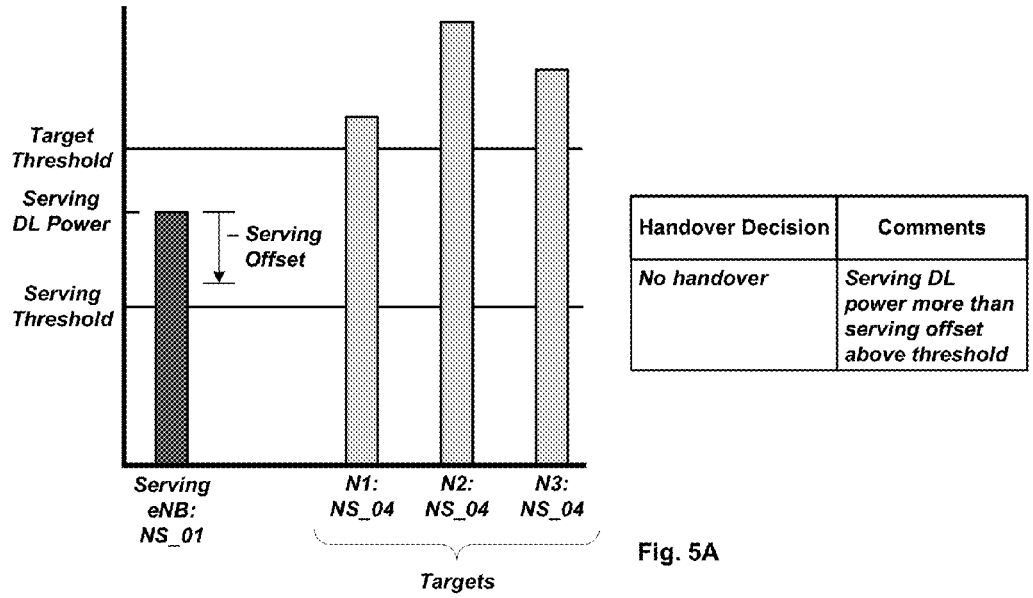
FIG. 5A is a conceptual depiction of an example method of accounting for network signaling values in handover decisions applied in a further illustrative use case, in accordance with an example embodiment.
Figure 5B:
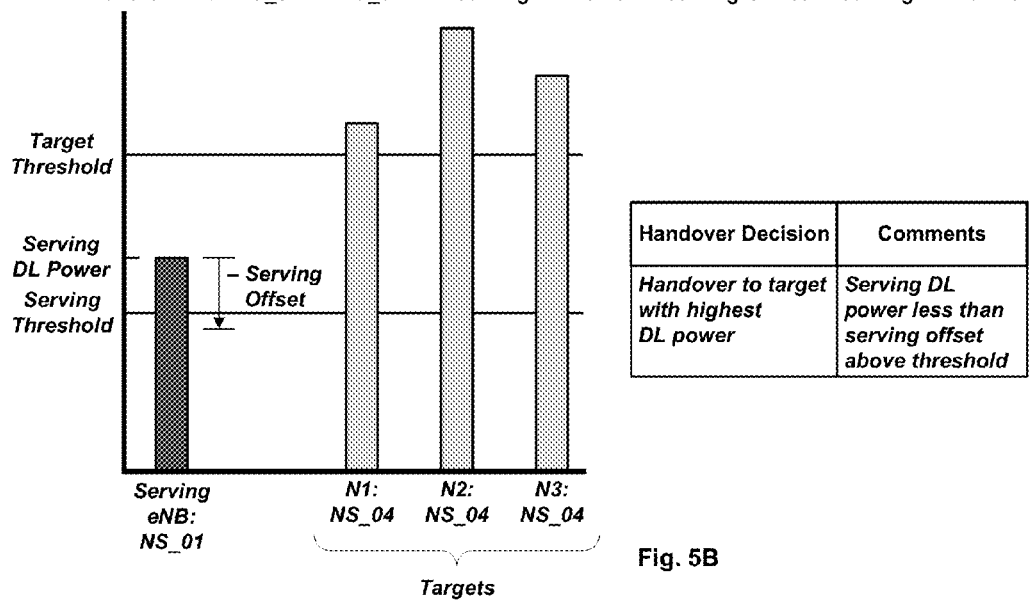
FIG. 5B is a conceptual depiction of an example method of accounting for network signaling values in handover decisions applied in still a further illustrative use case, in accordance with an example embodiment.

FIGS. 5A and 5B show A4 use cases in which the serving eNodeB is using NS_01 and each of three target eNodeBs is using NS_04. In both cases, a handover to any of the target eNodeBs will therefore result in the UE being directed to increase its uplink power. The handover decision logic then leads to a decision of whether to handover to one of the target eNodeBs based on whether or not the downlink power of the serving eNodeB measured by the UE is above the serving threshold by more than a "serving offset" amount, where the "serving offset" applied in the A4 use cases is not necessarily the same as that applied in the A3 use cases described above (although it could be). In accordance with example embodiments, the serving eNodeB could subtract the serving offset from the UE's measurement of the eNodeB's downlink power, and compare the result to the serving threshold. By way of example, the serving offset could be 2 dB, although other values could be used as well. The two use cases of FIGS. 5A and 5B can then be distinguished by the result of the comparison.

FIG. 5A illustrates the use case in which the downlink power of the serving eNodeB measured by the UE is above the serving threshold by more than the serving offset. Put another way (and as shown), the downlink power of the serving eNodeB minus the serving offset is greater than or equal to the serving threshold. In this use case, the serving eNodeB does not handover the UE to any of target eNodeBs, but instead continues to serve the UE, even though the A4 event has occurred. A table to the right of the bar graph summarizes the handover decision. A rationale for the decision not to handover in this case (illustrated in FIG. 5A) is that the serving eNodeB's downlink power is sufficiently far above the serving threshold to prefer not handing over in the first place. At the same time, a handover is guaranteed to cause the UE to increase its uplink attenuation, and therefore have degraded uplink service with any chosen target eNodeB. In this use case then, the tradeoff of increased downlink power is deemed not "worth" the degradation in uplink power.

FIG. 5B illustrates the use case in which the downlink power of the serving eNodeB measured by the UE in not above the serving threshold by more than the serving offset. Put another way (and as shown), the downlink power of the serving eNodeB minus the serving offset is less than the serving threshold. In this use case, the serving eNodeB hands over the UE to the target eNodeBs having the highest downlink power as measured by the UE. A table to the right of the bar graph again summarizes the handover decision. A rationale for the decision to handover in this case is that the serving eNodeB's downlink power is sufficiently close to the serving threshold to make a handover a "reasonable" action. Thus, the handover is made to the best target eNodeB—e.g., the one measured by the UE to have the highest downlink power. In the example illustrated, the UE would handover to the target N2.

Figure 5C:
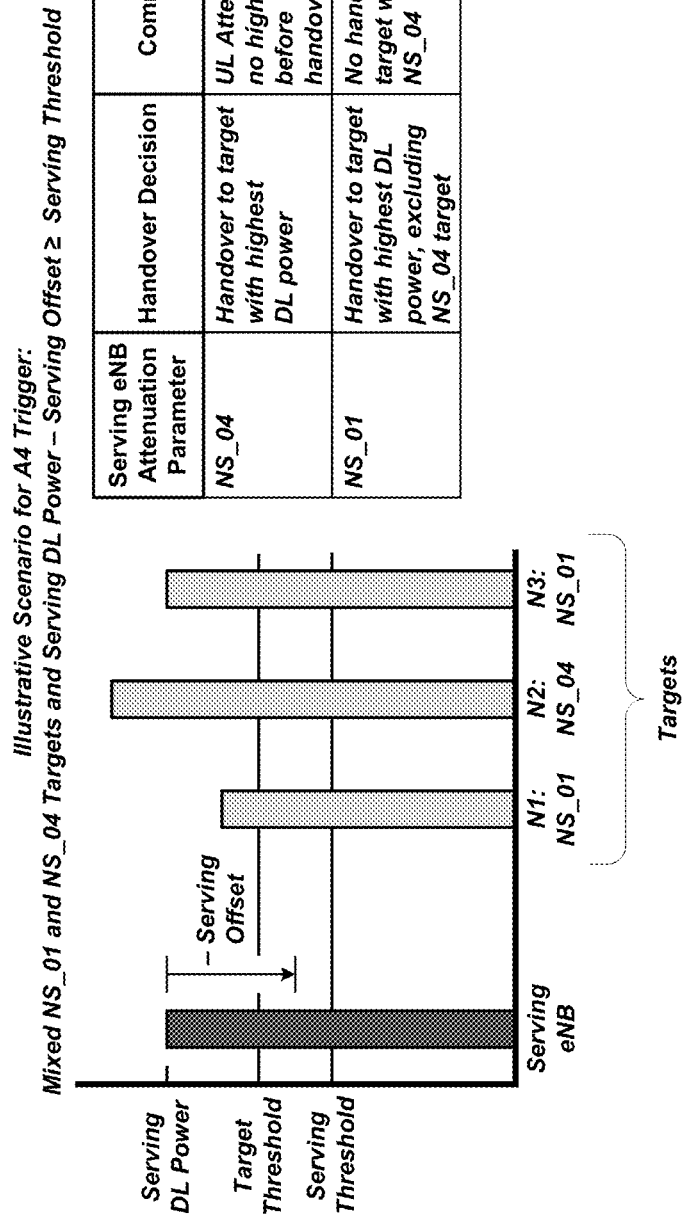
FIG. 5C is a conceptual depiction of an example method of accounting for network signaling values in handover decisions applied in yet a further illustrative use case, in accordance with an example embodiment.
Figure 5D:
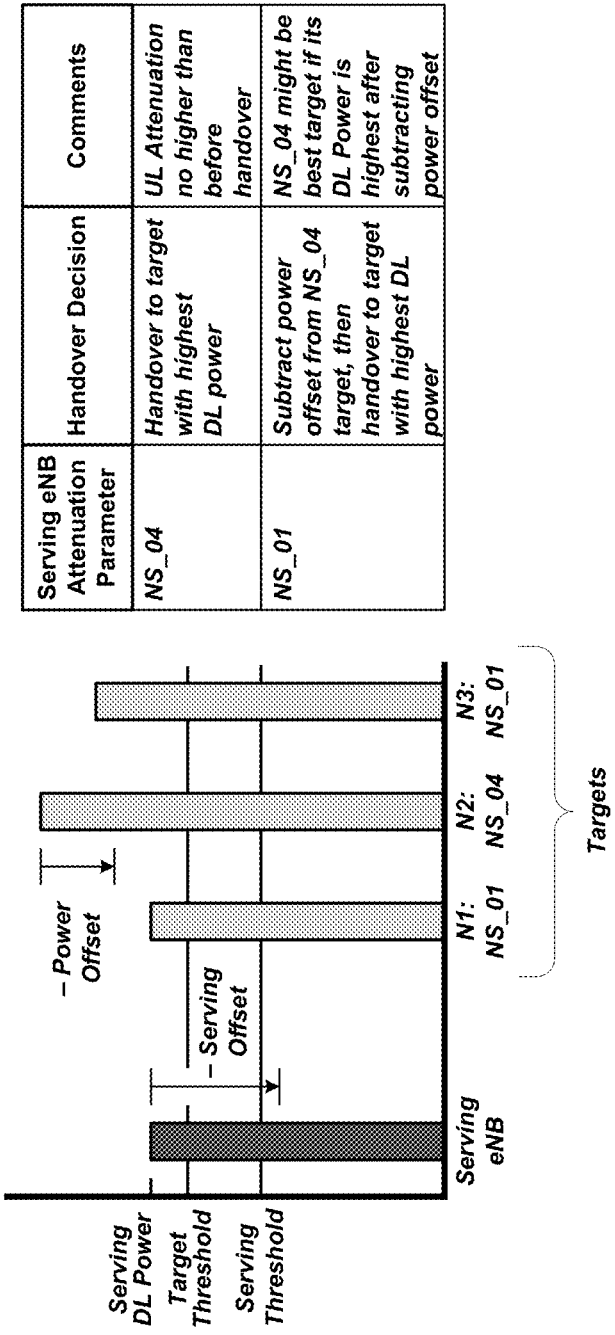
FIG. 5D is a conceptual depiction of an example method of accounting for network signaling values in handover decisions applied in still one more illustrative use case, in accordance with an example embodiment.

FIGS. 5C and 5D show A4 use cases in which the serving eNodeB is using either NS_01 or NS_04 and the three target eNodeBs are using a mix of NS_01 and NS_04. By way of example, N1 and N3 are each using NS_01 and N2 is using NS_04. Other mixes of NS_01 and NS_04 among eNodeBs will also fit this example use case. For each of these two use cases, a handover of the UE will result in an increase, decrease, or no change in uplink attenuation depending on whether the serving eNodeB is using NS_01 or NS_04, and which target eNodeB is considered. Again, the handover decision logic leads to a decision of whether to handover to one the target eNodeB based on whether or not the downlink power of the serving eNodeB measured by the UE is above the serving threshold by more than the serving offset amount. Thus, the serving eNodeB could again subtract the serving offset from the UE's measurement of the eNodeB's downlink power, and compare the result to the serving threshold. The two use cases of FIGS. 5C and 5D can then be distinguished by the result of the comparison.

FIG. 5C illustrates the use case in which the downlink power of the serving eNodeB measured by the UE is above the serving threshold by more than the serving offset. If the serving eNodeB is using NS_04, then the decision is made to handover the UE to the best target eNodeB—e.g., the one measured by the UE to have the highest downlink power. Again, this is the target N2 in the illustrated example. A rationale for the decision to handover in this case is that the UE's uplink attenuation will either decrease (e.g., NS_04→NS_01) or remain the same (e.g., NS_04→NS_04) for any possible handover. Thus, there is no expected degradation of uplink service, so the UE should handover to the eNodeB that will provide the best downlink service.

If in the use case of FIG. 5C the serving eNodeB is using NS_01, then a handover will result in either increased uplink attenuation (e.g., NS_01→NS_04) or no change in uplink attenuation (e.g. NS_01→NS_01). The serving eNodeB makes a decision to handover the UE to the best target eNodeB, but excluding any target eNodeB that is using NS_04. In the illustrated example, the UE would handover to the target N3. A rationale for the decision not to handover to any target eNodeB using NS_04 is similar to the rationale in the use case of FIG. 5A. Namely, since the UE's measurement of the serving eNodeB's downlink power is sufficiently far above the serving threshold to prefer not handing over in the first place, the tradeoff of increased downlink power is deemed not "worth" the degradation in uplink power that will result from handing over to a target eNodeB using NS_04.

On the other hand, a handover to any target eNodeB using NS_01 will result in no increase in uplink attenuation for the UE. In the illustrated example, the UE will handover to N3, which has (by way of example) the highest measured downlink power among the target eNodeBs using NS_01. The handover decisions for the use case of FIG. 5C are summarized in the table to the right of the bar graph.

FIG. 5D illustrates the use case in which the downlink power of the serving eNodeB measured by the UE is not above the serving threshold by more than the serving offset. If the serving eNodeB is using NS_04, then the decision is made to handover the UE to the best target eNodeB—e.g., the one measured by the UE to have the highest downlink power. Again, this is the target N2 in the illustrated example. A rationale for the decision to handover in this case is that the UE's uplink attenuation will either decrease (e.g., NS_04→NS_01) or remain the same (e.g., NS_04→NS_04) for any possible handover. Thus, there is no expected degradation of uplink service, so the UE should handover to the eNodeB that will provide the best downlink service.

If in the use case of FIG. 5D the serving eNodeB is using NS_01, then a handover will result in either increased uplink attenuation (e.g., NS_01→NS_04) or no change in uplink attenuation (e.g. NS_01→NS_01). In this case, the decision is made to handover the UE to the best target eNodeB, after applying a bias against any eNodeB using NS_04. More specifically, a "power offset" is first subtracted from the measured downlink power of any eNodeB using NS_04. Then a target eNodeB having the highest measured downlink power (including the power offset adjustment applied to the power of eNodeB using NS_04) is selected for a handover. In the illustrated example, N2 is using NS_04, so the power offset is first subtract from N2's measured downlink power. The subtraction results in an adjusted measurement for N2 that is, by way of example, below the measured downlink power of N3. Thus, in this example, N3 is selected for the handover. A rationale for this handover decision is that, while the serving eNodeB's downlink power is sufficiently close to the serving threshold to make a handover a "reasonable" action, any possible increase in uplink attenuation (e.g., NS_01→NS_04) still results in some degradation of uplink service. Subtracting the power offset (or applying some other type of bias) can help ensure that a target eNodeB using NS_04 will only be selected if its measured downlink power is higher than any target eNodeB using NS_01 by more than the power offset. As seen in this example, subtracting the power offset from the measured downlink power of N2 makes N2 a less desirable choice than N3. The handover decisions for the use case of FIG. 5D are summarized in the table to the right of the bar graph.

The example use cases illustrated in FIGS. 4A-4D and 5A-5D do not represent every possible use case involving the A3 and A4 events. However, they cover a large enough cross-section to serve as models for how handover logic can be fashioned to account for possible changes in uplink attenuation that might result from handovers. For example, the rationales discussed above can be readily adapted to cases in which there is only one target eNodeB (or base station) to consider. Further, the combination of conditions considered, such as measured downlink power of serving and target eNodeBs, network signaling values of serving and target eNodeBs, etc., can be arrived at by way of logical steps other than the ones described above. Thus, the specific logical steps described are not intended to be limiting with respect to how it may be determined that particular criteria of a handover decisions are satisfied. Furthermore, the specific criteria and/or combinations of conditions used to determine the various handover decisions illustrated above are not intended to be limiting. For example, the use case example of FIG. 5C could be modified to include the power offset subtraction applied in the use case example FIG. 5D. Other modifications of criteria and/or combinations of conditions, or different criteria and/or combinations of conditions, are possible as well.

Figure 6:
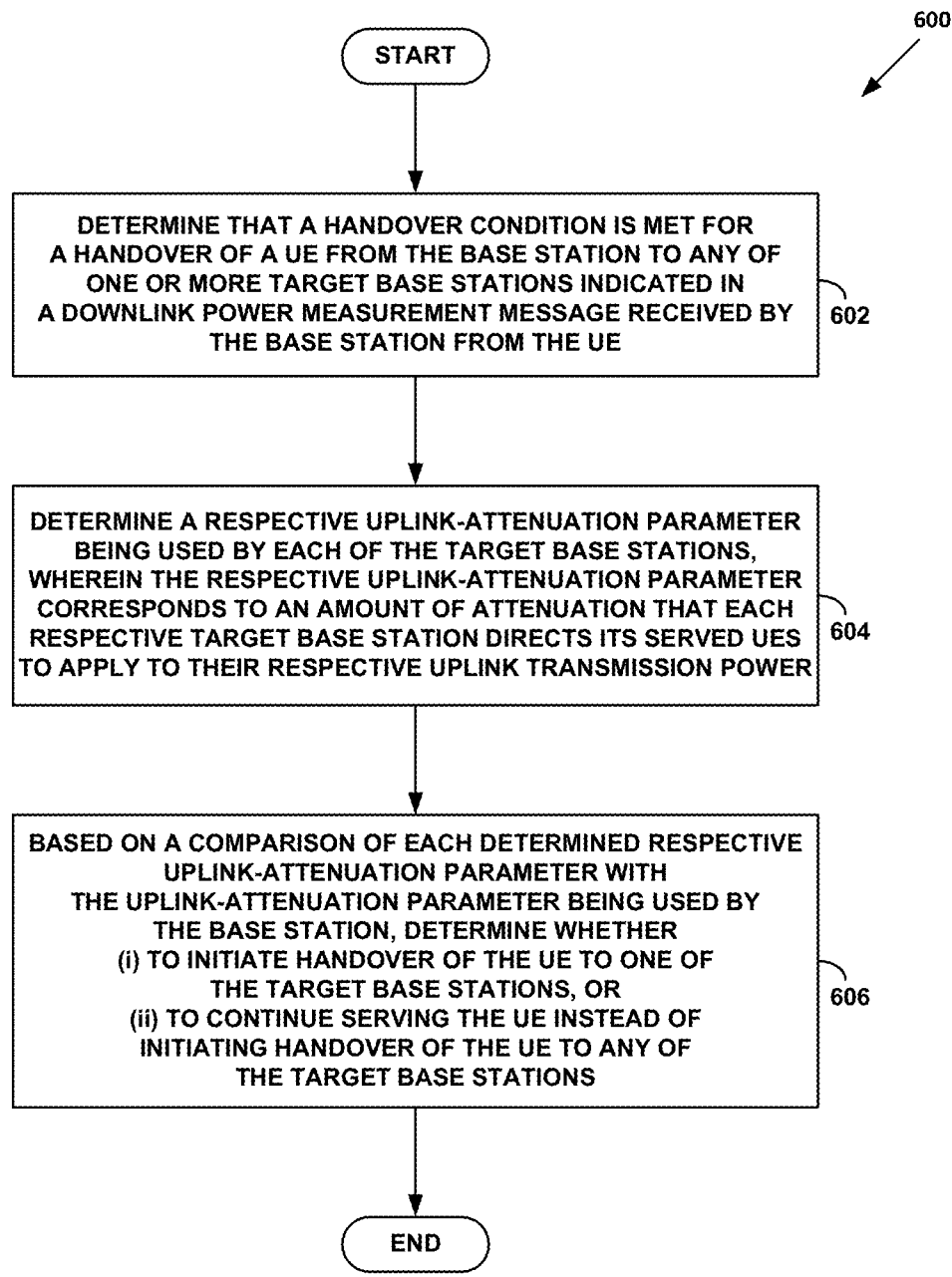
FIG. 6 is a flowchart illustrating an example method accounting for network signaling values in handover decisions, in accordance with an example embodiment.

FIG. 6 is a flowchart illustrating a method 600, according to an example embodiment. Illustrative methods, such as method 600, may be carried out in whole or in part by a base station or other component in a wireless communication system, such as by the eNodeB 112 of the representative LTE RAN 100 shown in FIG. 1, using one or more of the air interface arrangements shown in FIGS. 2A-2B. The eNodeB 304 in FIG. 3 is also an example of a network device or component that could be configured to carry out the example method 600. However, it should be understood that example methods, such as method 600, may be carried out by other entities or combinations of entities as well as in other arrangements, without departing from the scope of the invention. By way of example, the method 600 can be implemented as machine language instructions that can be stored on non-transitory machine-readable media (e.g, solid state memory, magnetic disk, etc), and that when executed by one or more processors of a base station to cause the base station to carry out operations, steps, and/or functions of the method.

Method 600 may be operable in a base station of a wireless communication network. In particular, the base station may be configured for providing wireless services to a user equipment device (UE) using air interface resources. In addition, the base station may be further configured to direct the served UE to apply to its uplink transmission power an amount of attenuation determined according to an uplink-attenuation parameter being used by the base station.

As shown by block 602 in FIG. 6, method 600 involves the base station determining that a handover condition is met for a handover of the UE from the base station one or more target base stations. More specifically, the base station may receive a downlink power measurement message (DPMM) from the UE, where the DPMM indicates that a handover condition is met for to any of one or more target base stations indicated in the DPMM.

As shown by block 604 in FIG. 6, method 600 next involves the base station determining a respective uplink-attenuation parameter being used by each respective target base station of the one or more target base stations. As with the uplink-attenuation parameter being used by the base station, the respective uplink-attenuation parameter used by each respective target base station can correspond to an amount of attenuation that the respective target base station directs its served UEs to apply to their respective uplink transmission power.

Finally, as shown by block 606, method 600 involves the base station comparing each determined respective uplink-attenuation parameter with its own uplink-attenuation parameter, and based on the comparison, making a handover determination of whether (i) to initiate handover of the UE to one of the one or more target base stations, or (ii) to continue serving the UE instead of initiating handover of the UE to any of the one or more target base stations.

In accordance with example embodiments, making the handover determination on the basis of the comparison can entail reevaluating the handover condition for each potential handover based, at least in part, on a change in uplink attenuation that the UE would apply as a result of the potential handover.

In further accordance with example embodiments, the DPMM can include measurements by the UE of downlink power of the base station and of each the target base stations. Then making the determination that the handover condition is met can entail determining that the measured downlink power of each of the target base stations is at least a target offset greater than the downlink power measured by the UE of the base station. For example, this handover condition can correspond to the A3 event in an LTE system, and, for the purposes of the present discussion, is referred to below as an "A3-like" handover condition. The handover condition can then be reevaluated in order to make the handover determination. More specifically, the base station can add a serving offset to its UE-measured downlink power to determine whether its measured downlink power is more than the serving offset below a serving threshold. The base station can also determine how the UE's uplink attenuation would change for each potential handover. Based on the relation of its measured downlink power to the serving threshold and the potential change in uplink attenuation for each potential handover, the base station can then make a handover determination, as described below.

For the A3-like handover condition, if (i) every target base station will direct the UE to increase attenuation of its uplink transmission power, and (ii) the measured downlink power of the base station is not more than a serving offset less than a serving threshold, then the base station can determine to continue serving the UE instead of initiating handover of the UE to any of the target base stations.

For the A3-like handover condition, if (i) every target base station will direct the UE to increase attenuation of its uplink transmission power, and (ii) the measured downlink power of the base station is more than the serving offset less than the serving threshold, then the base station can determine to initiate handover of the UE to a target base station having the highest measured downlink power.

For the A3-like handover condition, if every target base station will not direct the UE to increase attenuation of its uplink transmission power, then the base station can determine to initiate handover of the UE to a target base station having the highest measured downlink power.

For the A3-like handover condition, if the target base stations consist of a first group of at least one that will direct the UE to increase attenuation of its uplink transmission power and a second group of at least one that will not direct the UE to increase attenuation of its uplink transmission power, and (ii) the measured downlink power measured of the base station is not more than the serving offset less than the serving threshold, then the base station can determine to initiate handover of the UE to a target base station from among the second group that has the highest measured downlink power.

For the A3-like handover condition, if the target base stations consist of the first group and the second group, and (ii) the measured downlink power measured of the base station is more than the serving offset less than the serving threshold, then the base station can first subtract a power offset from the measured downlink power of each target base station of the first group and, after subtracting, make a determination to initiate handover of the UE to a target base station from among both the first and second groups that has the highest measured downlink power.

In further accordance with example embodiments, making the determination that the handover condition is met can instead entail determining that the measured downlink power of each of the target base stations is greater than a target threshold. For example, this handover condition can correspond to the A4 event in an LTE system, and, for the purposes of the present discussion, is referred to below as an "A4-like" handover condition. This handover condition can also be reevaluated in order to make the handover determination. More specifically, the base station can subtract the serving offset from its UE-measured downlink power to determine whether its measured downlink power is more than the serving offset above a serving threshold. The base station can again determine how the UE's uplink attenuation would change for each potential handover. Based on this alternative relation of its measured downlink power to the serving threshold and the potential change in uplink attenuation for each potential handover, the base station can then make a handover determination, as described below.

For the A4-like handover condition, if (i) every target base station will direct the UE to increase attenuation of its uplink transmission power, and (ii) the measured downlink power of the base station is more than a serving offset greater than a serving threshold, then the base station can determine to continue serving the UE instead of initiating handover of the UE to any of the target base stations.

For the A4-like handover condition, if (i) every target base station will direct the UE to increase attenuation of its uplink transmission power, and (ii) the measured downlink power of the base station is less than the serving offset greater than the serving threshold, then the base station can determine to initiate handover of the UE to a target base station having the highest measured downlink power.

For the A4-like handover condition, if every target base station will not direct the UE to increase attenuation of its uplink transmission power, then the base station can determine to initiate handover of the UE to a target base station having the highest measured downlink power.

For the A4-like handover condition, if the target base stations consist of a first group of at least one that will direct the UE to increase attenuation of its uplink transmission power and a second group of at least one that will not direct the UE to increase attenuation of its uplink transmission power, and (ii) the measured downlink power measured of the base station is more than the serving offset greater than the serving threshold, then the base station can determine to initiate handover of the UE to a target base station from among the second group that has the highest measured downlink power.

For the A4-like handover condition, if the target base stations consist of the first group and the second group, and (ii) the measured downlink power measured of the base station is less than the serving offset greater than the serving threshold, then the base station can first subtract a power offset from the measured downlink power of each target base station of the first group and, after subtracting, make a determination to initiate handover of the UE to a target base station from among both the first and second groups that has the highest measured downlink power.

In accordance with example embodiments, the wireless communication system can configured to operate according to at least LTE, in which case, the DPMM can be a reference signal received power (RSRP) message or a reference signal received quality (RSRQ) message. For an LTE system, the uplink-attenuation parameter used at any one time an eNodeB can be either a NS_01 network signaling value or a NS_04 network signaling value. As noted above, NS_04 is used signal a higher amount of uplink attenuation than is NS_01. Determining that the handover condition is met for a handover of the UE from the base station to any of target base stations indicated in the DPMM can the entail determining that the UE is reporting a handover trigger event. In an LTE system, for example, the handover trigger event can be an A3 trigger or an A4 trigger.

In further accordance with example embodiments, the base station can determine the respective uplink-attenuation parameter being used by each respective target base station by sending a query message to each target base stations for the network signaling value being used. The base station can then receive a response to the query message from each one of the one or more target base stations indicating the network signaling value being (e.g., NS_01 or NS_04).

In further accordance with example embodiments, if the base station is using NS_01 and the handover trigger event is an A3 trigger, then making the handover determination can entail determining measurements by the UE of downlink power of the base station and of each base station. Then, if the measured downlink power of the base station is not greater than a serving offset less than a serving threshold power level, the base station can exclude as a potential handover target any of the target base stations that are determined to be using NS_04.

In further accordance with example embodiments, if the base station is using NS_01 and the handover trigger event is an A4 trigger, then making the handover determination can entail determining measurements by the UE of downlink power of the base station and of each of base station. Then, if the measured downlink power of the base station is at least a serving offset above a serving threshold power level, the base station can exclude as a potential handover target any of the target base stations that are determined to be using NS_04.

It will be appreciated that the example method 600 could each include alternate and/or additional steps, while still remaining within the scope and spirit of example embodiments herein.

Figure 7:
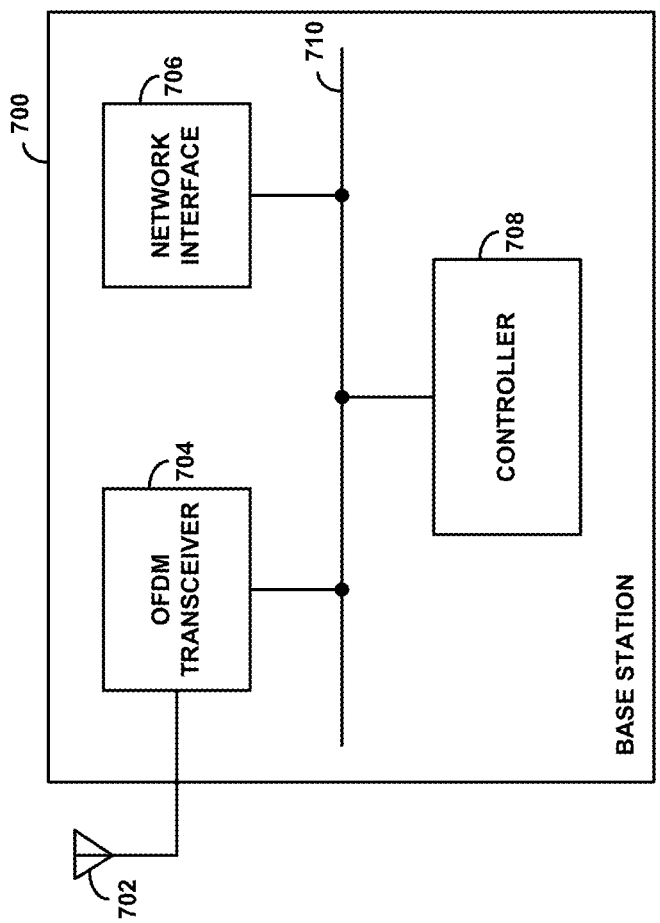
FIG. 7 is a simplified block diagram of an example cellular base station, in accordance with an example embodiment.
Figure 8:
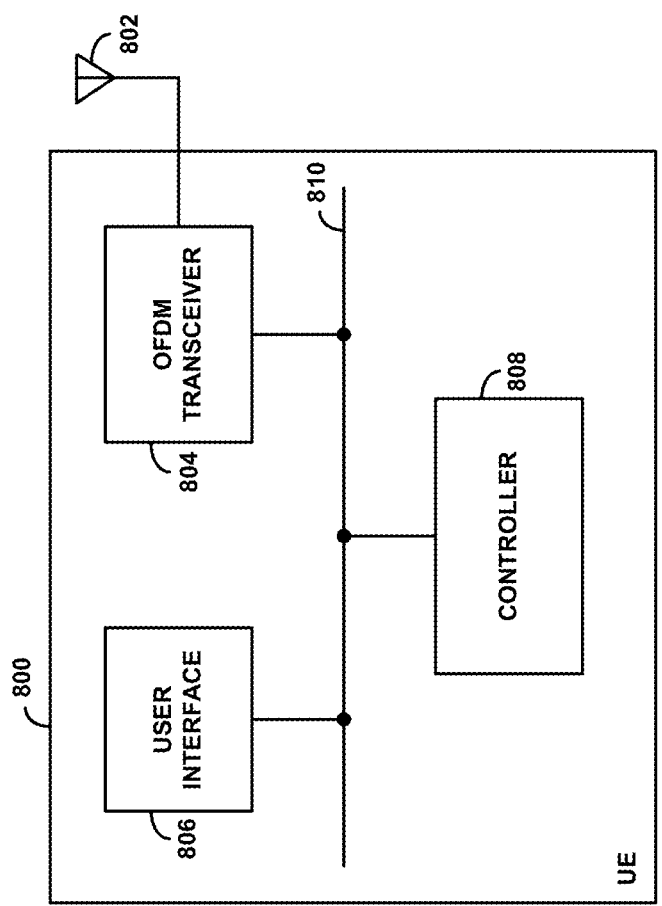
FIG. 8 is a simplified block diagram of an example UE, in accordance with an example embodiment.

Example embodiments of a base station and a UE are shown in FIGS. 7 and 8. More particularly, FIG. 7 is a simplified block diagram of an example cellular base station 700, such as the eNodeB 112 in FIG. 1, showing some of the components of such a base station to facilitate implementation of the present method. As shown in FIG. 7, the example base station 700 includes an OFDM transceiver 704 and an associated antenna structure 703, as well as a network interface 706, and a controller 708, with various ones of these or other components being communicatively linked together by a system bus, network, or other connection mechanism 710.

The OFDM transceiver 704 and antenna structure 702 may function in combination to provide an OFDMA air interface as described above. As such, the OFDM transceiver 704 is configured to receive data, generate OFDM symbols from the data, and transmit the OFDM symbols on the air interface, and to define on the air interface various channels such as a PDCCH and PDSCH as discussed above. Network interface 706 may then comprise a wired and/or wireless network communication interface (such as an Ethernet interface) through which the base station may receive data over a backhaul connection that connects the base station to one or more entities of a wireless network, such as an SGW as discussed above for instance, for transmission of the data to one or more UEs served by the base station.

The controller 708, which may be integrated with OFDM transceiver 704 or one or more other components, may then control the transmission of data, including control and user data, on the downlink air interface. For example, the controller 706 may allocate uplink resource blocks to UEs and generate corresponding DCI messages, and the controller 708 may control transmission by the OFDM transceiver 704 accordingly. Further, the controller 708 may cause the OFDM transceiver 704 to transmit to a UE a network signal indicating that the UE should apply additional attenuation on its uplink transmissions.

The controller 708 could be implemented using hardware, software, and/or firmware. For example, controller 708 could include one or more processors and a non-transitory computer readable medium (e.g., volatile and/or non-volatile memory) that stores executable instructions. The executable instructions, when executed by the one or more processors, may cause the controller 708 to perform any of the base station functions described herein.

Finally, FIG. 8 is a simplified block diagram of an example UE 800, such as the UE 116 in FIG. 1 or the UE 302 in FIG. 3, showing some of the components of such a UE to facilitate implementation of the present method. As shown in FIG. 8, the example UE 800 includes a user interface 806, an OFDM transceiver 804 and an associated antenna structure 802, and a controller 808, with various ones of these or other components being communicatively linked together by a system bus, network, or other connection mechanism 810.

The user interface 806 may include input and output components to facilitate interaction with a user if the UE is a user-operable device. The OFDM transceiver 804 and antenna structure 802 may then function in combination to engage in OFDMA air interface communication with a cellular base station such as that described above. As such, the OFDM transceiver 804 may be configured to receive OFDM communications on an air interface as described above, including for instance PDCCH communications and PDSCH communications, and to transmit OFDM communications, including for instance PUCCH communications and PUSCH communications, also as described above. And the controller 808, which may be integrated with the OFDM transceiver 804 or one or more other components, may control the processing of received communications, including control and user data.

Exemplary embodiments have been described above. Those skilled in the art will understand, however, that changes and modifications may be made to these embodiments without departing from the true scope and spirit of the invention.

We claim:

1. A method operable in a base station of a wireless communication network, wherein the base station serves a user equipment device (UE) and directs the UE to apply to its uplink transmission power an amount of attenuation determined according to an uplink-attenuation parameter being used by the base station, the method comprising:

based on a downlink power measurement message (DPMM) received by the base station from the UE, the base station determining that a handover condition is met for a handover of the UE from the base station to any of one or more target base stations indicated in the DPMM;

determining, by the base station, a respective uplink-attenuation parameter being used by each respective target base station of the one or more target base stations, wherein the respective uplink-attenuation parameter used by each respective target base station corresponds to an amount of attenuation that the respective target base station directs its served UEs to apply to their respective uplink transmission power; and based on a comparison of each determined respective uplink-attenuation parameter with the uplink-attenuation parameter being used by the base station, the base station making a handover determination of whether (i) to initiate handover of the UE to one of the one or more target base stations, or (ii) to continue serving the UE instead of initiating handover of the UE to any of the one or more target base stations.

2. The method of claim 1, wherein, based on the comparison of each determined respective uplink-attenuation parameter with the uplink-attenuation parameter being used by the base station, the base station making the handover determination of whether (i) to initiate handover of the UE to one of the one or more target base stations, or (ii) to continue serving the UE instead of initiating handover of the UE to any of the one or more target base stations comprises:

for each potential handover from the base station to a respective one of the one or more target base stations, making the handover determination by reevaluating the handover condition based at least on a change in uplink attenuation that the UE would apply as a result of the potential handover.

3. The method of claim 2, wherein the DPMM includes measurements by the UE of downlink power of the base station and of each of one or more target base stations, wherein making the determination that the handover condition is met comprises determining that the downlink power measured by the UE of each of the one or more target base stations is at least a target offset greater than the downlink power measured by the UE of the base station, and wherein making the handover determination by reevaluating the handover condition comprises:

if (i) every one of the one or more target base stations will, based on its respective uplink-attenuation parameter, direct the UE to increase attenuation of its uplink transmission power, and (ii) the downlink power measured by the UE of the base station is not more than a serving offset less than a serving threshold, then making a determination to continue serving the UE instead of initiating handover of the UE to any of the one or more target base stations;

if (i) every one of the one or more target base stations will, based on its respective uplink-attenuation parameter, direct the UE to increase attenuation of its uplink transmission power, and (ii) the downlink power measured by the UE of the base station is more than the serving offset less than the serving threshold, then making a determination to initiate handover of the UE to a target base station having the highest downlink power measured by the UE;

if every one of the one or more target base stations will not, based on its respective uplink-attenuation parameter, direct the UE to increase attenuation of its uplink transmission power, then making a determination to initiate handover of the UE to a target base station having the highest downlink power measured by the UE;

if (i) the one or more target base stations consists of a first group of at least one target base station that will direct the UE to increase attenuation of its uplink transmission power and a second group of at least one target base station that will not direct the UE to increase attenuation of its uplink transmission power, and (ii) the downlink power measured by the UE of the base station is not more than the serving offset less than the serving threshold, then making a determination to initiate handover of the UE to a target base station from among the second group that has the highest downlink power measured by the UE; and if (i) the one or more target base stations consists of the first group and the second group, and (ii) the downlink power measured by the UE of the base station is more than the serving offset less than the serving threshold, then subtracting a power offset from the measured downlink power of each target base station of the first group and, after subtracting, making a determination to initiate handover of the UE to a target base station from among both the first and second groups that has the highest downlink power measured by the UE.

4. The method of claim 2, wherein the DPMM includes measurements by the UE of downlink power of the base station and of each of one or more target base stations, wherein making the determination that the handover condition is met comprises determining that the downlink power measured by the UE of each of the one or more target base stations is greater than a target threshold, and wherein making the handover determination by reevaluating the handover condition comprises:

if (i) every one of the one or more target base stations will, based on its respective uplink-attenuation parameter, direct the UE to increase attenuation of its uplink transmission power, and (ii) the downlink power measured by the UE of the base station is more than a serving offset greater than a serving threshold, then making a determination to continue serving the UE instead of initiating handover of the UE to any of the one or more target base stations;

if (i) every one of the one or more target base stations will, based on its respective uplink-attenuation parameter, direct the UE to increase attenuation of its uplink transmission power, and (ii) the downlink power measured by the UE of the base station is less than the serving offset greater than the serving threshold, then making a determination to initiate handover of the UE to a target base station having the highest downlink power measured by the UE;

if every one of the one or more target base stations will not, based on its respective uplink-attenuation parameter, direct the UE to increase attenuation of its uplink transmission power, then making a determination to initiate handover of the UE to a target base station having the highest downlink power measured by the UE;

if (i) the one or more target base stations consists of a first group of at least one target base station that will direct the UE to increase attenuation of its uplink transmission power and a second group of at least one target base station that will not direct the UE to increase attenuation of its uplink transmission power, and (ii) the downlink power measured by the UE of the base station is more than the serving offset greater than the serving threshold, then making a determination to initiate handover of the UE to a target base station from among the second group that has the highest downlink power measured by the UE; and if (i) the one or more target base stations consists of the first group and the second group, and (ii) the downlink power measured by the UE of the base station is less than the serving offset greater than the serving threshold, then subtracting a power offset from the measured downlink power of each target base station of the first group and, after subtracting, making a determination to initiate handover of the UE to a target base station from among both the first and second groups that has the highest downlink power measured by the UE.

5. The method of claim 1, wherein the wireless communication system is configured to operate according to at least LTE, wherein the uplink-attenuation parameter being used by the base station and each respective uplink-attenuation parameter being used by each respective target base station of the one or more target base stations is one of a NS_01 network signaling value or a NS_04 network signaling value, wherein NS_04 is used by base stations to signal served UEs to apply a higher amount of uplink attenuation than is NS_01, wherein the DPMM is one of a reference signal received power (RSRP) message or a reference signal received quality (RSRQ) message, and wherein determining that the handover condition is met for a handover of the UE from the base station to any of one or more target base stations indicated in the DPMM comprises determining that the UE is reporting a handover trigger event, wherein the handover trigger event is one an A3 trigger that applies to the one or more target base stations or an A4 trigger that applies to the one or more target base stations.

6. The method of claim 5, wherein determining, by the base station, the respective uplink-attenuation parameter being used by each respective target base station of the one or more target base stations comprises:

the base station sending a query message to each one of the one or more target base stations for the network signaling value being used by the one of the one or more target base stations; and the base station receiving a response to the query message from each one of the one or more target base stations indicating the network signaling value being used by the one of the one or more target base stations.

7. The method of claim 5, wherein the base station is using NS_01 and the handover trigger event is an A3 trigger, and wherein, making the handover determination of whether (i) to initiate handover of the UE to one of the one or more target base stations, or (ii) to continue serving the UE instead of initiating handover of the UE to any of the one or more target base stations comprises:

based on the handover trigger event, determining measurements by the UE of downlink power of the base station and of each of one or more target base stations; and if the downlink power measured by the UE of the base station is not greater than a serving offset less than a serving threshold power level, excluding as a potential handover target any of the one or more target base stations that is determined to be using NS_04.

8. The method of claim 5, wherein the base station is using NS_01 and the handover trigger event is an A4 trigger, and wherein, making the handover determination of whether (i) to initiate handover of the UE to one of the one or more target base stations, or (ii) to continue serving the UE instead of initiating handover of the UE to any of the one or more target base stations comprises:

based on the handover trigger event, determining measurements by the UE of downlink power of the base station and of each of one or more target base stations; and if the downlink power measured by the UE of the base station is at least a serving offset above a serving threshold power level, excluding as a potential handover target any of the one or more target base stations that is determined to be using NS_04.

9. A base station operable in a wireless communication network, wherein the base station is configured to serve a user equipment device (UE) and to direct the UE to apply to its uplink transmission power an amount of attenuation determined according to an uplink-attenuation parameter being used by the base station, the base station comprising:

one or more processors; and memory accessible to the one or more processors, and storing machine language instructions that, upon execution by the one or more processors, cause the base station to carry out operations including:

based on a downlink power measurement message (DPMM) received by the base station from the UE, determining that a handover condition is met for a handover of the UE from the base station to any of one or more target base stations indicated in the DPMM, determining a respective uplink-attenuation parameter being used by each respective target base station of the one or more target base stations, wherein the respective uplink-attenuation parameter used by each respective target base station corresponds to an amount of attenuation that the respective target base station directs its served UEs to apply to their respective uplink transmission power, and based on a comparison of each determined respective uplink-attenuation parameter with the uplink-attenuation parameter being used by the base station, making a handover determination of whether (i) to initiate handover of the UE to one of the one or more target base stations, or (ii) to continue serving the UE instead of initiating handover of the UE to any of the one or more target base stations.

10. The base station of claim 9, wherein, based on the comparison of each determined respective uplink-attenuation parameter with the uplink-attenuation parameter being used by the base station, making the handover determination of whether (i) to initiate handover of the UE to one of the one or more target base stations, or (ii) to continue serving the UE instead of initiating handover of the UE to any of the one or more target base stations comprises:

for each potential handover from the base station to a respective one of the one or more target base stations, making the handover determination by reevaluating the handover condition based at least on a change in uplink attenuation that the UE would apply as a result of the potential handover.

11. The base station of claim 9, wherein the DPMM includes measurements by the UE of downlink power of the base station and of each of one or more target base stations, wherein making the determination that the handover condition is met comprises determining that the downlink power measured by the UE of each of the one or more target base stations is at least a target offset greater than the downlink power measured by the UE of the base station, and wherein making the handover determination by reevaluating the handover condition comprises:

if (i) every one of the one or more target base stations will, based on its respective uplink-attenuation parameter, direct the UE to increase attenuation of its uplink transmission power, and (ii) the downlink power measured by the UE of the base station is not more than a serving offset less than a serving threshold, then making a determination to continue serving the UE instead of initiating handover of the UE to any of the one or more target base stations;

if (i) every one of the one or more target base stations will, based on its respective uplink-attenuation parameter, direct the UE to increase attenuation of its uplink transmission power, and (ii) the downlink power measured by the UE of the base station is more than the serving offset less than the serving threshold, then making a determination to initiate handover of the UE to a target base station having the highest downlink power measured by the UE;

if every one of the one or more target base stations will not, based on its respective uplink-attenuation parameter, direct the UE to increase attenuation of its uplink transmission power, then making a determination to initiate handover of the UE to a target base station having the highest downlink power measured by the UE;

if (i) the one or more target base stations consists of a first group of at least one target base station that will direct the UE to increase attenuation of its uplink transmission power and a second group of at least one target base station that will not direct the UE to increase attenuation of its uplink transmission power, and (ii) the downlink power measured by the UE of the base station is not more than the serving offset less than the serving threshold, then making a determination to initiate handover of the UE to a target base station from among the second group that has the highest downlink power measured by the UE; and if (i) the one or more target base stations consists of the first group and the second group, and (ii) the downlink power measured by the UE of the base station is more than the serving offset less than the serving threshold, then subtracting a power offset from the measured downlink power of each target base station of the first group and, after subtracting, making a determination to initiate handover of the UE to a target base station from among both the first and second groups that has the highest downlink power measured by the UE.

12. The base station of claim 9, wherein the DPMM includes measurements by the UE of downlink power of the base station and of each of one or more target base stations, wherein making the determination that the handover condition is met comprises determining that the downlink power measured by the UE of each of the one or more target base stations is greater than a target threshold, and wherein making the handover determination by reevaluating the handover condition comprises:

if (i) every one of the one or more target base stations will, based on its respective uplink-attenuation parameter, direct the UE to increase attenuation of its uplink transmission power, and (ii) the downlink power measured by the UE of the base station is more than a serving offset greater than a serving threshold, then making a determination to continue serving the UE instead of initiating handover of the UE to any of the one or more target base stations;

if (i) every one of the one or more target base stations will, based on its respective uplink-attenuation parameter, direct the UE to increase attenuation of its uplink transmission power, and (ii) the downlink power measured by the UE of the base station is less than the serving offset greater than the serving threshold, then making a determination to initiate handover of the UE to a target base station having the highest downlink power measured by the UE;

if every one of the one or more target base stations will not, based on its respective uplink-attenuation parameter, direct the UE to increase attenuation of its uplink transmission power, then making a determination to initiate handover of the UE to a target base station having the highest downlink power measured by the UE;

if (i) the one or more target base stations consists of a first group of at least one target base station that will direct the UE to increase attenuation of its uplink transmission power and a second group of at least one target base station that will not direct the UE to increase attenuation of its uplink transmission power, and (ii) the downlink power measured by the UE of the base station is more than the serving offset greater than the serving threshold, then making a determination to initiate handover of the UE to a target base station from among the second group that has the highest downlink power measured by the UE; and if (i) the one or more target base stations consists of the first group and the second group, and (ii) the downlink power measured by the UE of the base station is less than the serving offset greater than the serving threshold, then subtracting a power offset from the measured downlink power of each target base station of the first group and, after subtracting, making a determination to initiate handover of the UE to a target base station from among both the first and second groups that has the highest downlink power measured by the UE.

13. The base station of claim 9, wherein the wireless communication system is configured to operate according to at least LTE, wherein the uplink-attenuation parameter being used by the base station and each respective uplink-attenuation parameter being used by each respective target base station of the one or more target base stations is one of a NS_01 network signaling value or a NS_04 network signaling value, wherein NS_04 is used by base stations to signal served UEs to apply a higher amount of uplink attenuation than is NS_01, wherein the DPMM is one of a reference signal received power (RSRP) message or a reference signal received quality (RSRQ) message, and wherein determining the respective uplink-attenuation parameter being used by each respective target base station of the one or more target base stations comprises:

sending a query message to each one of the one or more target base stations for the network signaling value being used by the one of the one or more target base stations; and receiving a response to the query message from each one of the one or more target base stations indicating the network signaling value being used by the one of the one or more target base stations.

14. The base station of claim 13, wherein the base station is using NS_01, wherein determining that the handover condition is met for a handover of the UE from the base station to any of one or more target base stations indicated in the DPMM comprises determining that the UE is reporting a handover trigger event, wherein the handover trigger event is one an A3 trigger that applies to the one or more target base stations or an A4 trigger that applies to the one or more target base stations, and wherein making the handover determination of whether (i) to initiate handover of the UE to one of the one or more target base stations, or (ii) to continue serving the UE instead of initiating handover of the UE to any of the one or more target base stations comprises:

based on the handover trigger event, determining measurements by the UE of downlink power of the base station and of each of one or more target base stations;

if the handover trigger event is an A3 trigger and the downlink power measured by the UE of the base station is not greater than a serving offset less than a serving threshold power level, then excluding as a potential handover target any of the one or more target base stations that is determined to be using NS_04; and if the handover trigger event is an A4 trigger and the downlink power measured by the UE of the base station is at least a serving offset above a serving threshold power level, the excluding as a potential handover target any of the one or more target base stations that is determined to be using NS_04.

15. A non-transitory computer readable medium having stored thereon instructions that, upon executing by one or more processors of a base station, cause the base station to carry out operations, wherein the base station is configured to serve a user equipment device (UE) and to direct the UE to apply to its uplink transmission power an amount of attenuation determined according to an uplink-attenuation parameter being used by the base station, wherein the operations comprise:

based on a downlink power measurement message (DPMM) received by the base station from the UE, determining that a handover condition is met for a handover of the UE from the base station to any of one or more target base stations indicated in the DPMM;

determining a respective uplink-attenuation parameter being used by each respective target base station of the one or more target base stations, wherein the respective uplink-attenuation parameter used by each respective target base station corresponds to an amount of attenuation that the respective target base station directs its served UEs to apply to their respective uplink transmission power; and based on a comparison of each determined respective uplink-attenuation parameter with the uplink-attenuation parameter being used by the base station, making a handover determination of whether (i) to initiate handover of the UE to one of the one or more target base stations, or (ii) to continue serving the UE instead of initiating handover of the UE to any of the one or more target base stations.

16. The non-transitory computer readable medium of claim 15, wherein, based on the comparison of each determined respective uplink-attenuation parameter with the uplink-attenuation parameter being used by the base station, making the handover determination of whether (i) to initiate handover of the UE to one of the one or more target base stations, or (ii) to continue serving the UE instead of initiating handover of the UE to any of the one or more target base stations comprises:

for each potential handover from the base station to a respective one of the one or more target base stations, making the handover determination by reevaluating the handover condition based at least on a change in uplink attenuation that the UE would apply as a result of the potential handover.

17. The non-transitory computer readable medium of claim 15, wherein the DPMM includes measurements by the UE of downlink power of the base station and of each of one or more target base stations, wherein making the determination that the handover condition is met comprises determining that the downlink power measured by the UE of each of the one or more target base stations is at least a target offset greater than the downlink power measured by the UE of the base station, and wherein making the handover determination by reevaluating the handover condition comprises:

if (i) every one of the one or more target base stations will, based on its respective uplink-attenuation parameter, direct the UE to increase attenuation of its uplink transmission power, and (ii) the downlink power measured by the UE of the base station is not more than a serving offset less than a serving threshold, then making a determination to continue serving the UE instead of initiating handover of the UE to any of the one or more target base stations;

if (i) every one of the one or more target base stations will, based on its respective uplink-attenuation parameter, direct the UE to increase attenuation of its uplink transmission power, and (ii) the downlink power measured by the UE of the base station is more than the serving offset less than the serving threshold, then making a determination to initiate handover of the UE to a target base station having the highest downlink power measured by the UE;

if every one of the one or more target base stations will not, based on its respective uplink-attenuation parameter, direct the UE to increase attenuation of its uplink transmission power, then making a determination to initiate handover of the UE to a target base station having the highest downlink power measured by the UE;

if (i) the one or more target base stations consists of a first group of at least one target base station that will direct the UE to increase attenuation of its uplink transmission power and a second group of at least one target base station that will not direct the UE to increase attenuation of its uplink transmission power, and (ii) the downlink power measured by the UE of the base station is not more than the serving offset less than the serving threshold, then making a determination to initiate handover of the UE to a target base station from among the second group that has the highest downlink power measured by the UE; and if (i) the one or more target base stations consists of the first group and the second group, and (ii) the downlink power measured by the UE of the base station is more than the serving offset less than the serving threshold, then subtracting a power offset from the measured downlink power of each target base station of the first group and, after subtracting, making a determination to initiate handover of the UE to a target base station from among both the first and second groups that has the highest downlink power measured by the UE.

18. The non-transitory computer readable medium of claim 15, wherein the DPMM includes measurements by the UE of downlink power of the base station and of each of one or more target base stations, wherein making the determination that the handover condition is met comprises determining that the downlink power measured by the UE of each of the one or more target base stations is greater than a target threshold, and wherein making the handover determination by reevaluating the handover condition comprises:

if (i) every one of the one or more target base stations will, based on its respective uplink-attenuation parameter, direct the UE to increase attenuation of its uplink transmission power, and (ii) the downlink power measured by the UE of the base station is more than a serving offset greater than a serving threshold, then making a determination to continue serving the UE instead of initiating handover of the UE to any of the one or more target base stations;

if (i) every one of the one or more target base stations will, based on its respective uplink-attenuation parameter, direct the UE to increase attenuation of its uplink transmission power, and (ii) the downlink power measured by the UE of the base station is less than the serving offset greater than the serving threshold, then making a determination to initiate handover of the UE to a target base station having the highest downlink power measured by the UE;

if every one of the one or more target base stations will not, based on its respective uplink-attenuation parameter, direct the UE to increase attenuation of its uplink transmission power, then making a determination to initiate handover of the UE to a target base station having the highest downlink power measured by the UE;

if (i) the one or more target base stations consists of a first group of at least one target base station that will direct the UE to increase attenuation of its uplink transmission power and a second group of at least one target base station that will not direct the UE to increase attenuation of its uplink transmission power, and (ii) the downlink power measured by the UE of the base station is more than the serving offset greater than the serving threshold, then making a determination to initiate handover of the UE to a target base station from among the second group that has the highest downlink power measured by the UE; and if (i) the one or more target base stations consists of the first group and the second group, and (ii) the downlink power measured by the UE of the base station is less than the serving offset greater than the serving threshold, then subtracting a power offset from the measured downlink power of each target base station of the first group and, after subtracting, making a determination to initiate handover of the UE to a target base station from among both the first and second groups that has the highest downlink power measured by the UE.

19. The non-transitory computer readable medium of claim 15, wherein the wireless communication system is configured to operate according to at least LTE, wherein the uplink-attenuation parameter being used by the base station and each respective uplink-attenuation parameter being used by each respective target base station of the one or more target base stations is one of a NS_01 network signaling value or a NS_04 network signaling value, wherein NS_04 is used by base stations to signal served UEs to apply a higher amount of uplink attenuation than is NS_01, wherein the DPMM is one of a reference signal received power (RSRP) message or a reference signal received quality (RSRQ) message, and wherein determining the respective uplink-attenuation parameter being used by each respective target base station of the one or more target base stations comprises:

sending a query message to each one of the one or more target base stations for the network signaling value being used by the one of the one or more target base stations; and receiving a response to the query message from each one of the one or more target base stations indicating the network signaling value being used by the one of the one or more target base stations.

20. The non-transitory computer readable medium of claim 19, wherein the base station is using NS_01, wherein determining that the handover condition is met for a handover of the UE from the base station to any of one or more target base stations indicated in the DPMM comprises determining that the UE is reporting a handover trigger event, wherein the handover trigger event is one an A3 trigger that applies to the one or more target base stations or an A4 trigger that applies to the one or more target base stations, and wherein making the handover determination of whether (i) to initiate handover of the UE to one of the one or more target base stations, or (ii) to continue serving the UE instead of initiating handover of the UE to any of the one or more target base stations comprises:

based on the handover trigger event, determining measurements by the UE of downlink power of the base station and of each of one or more target base stations;

if the handover trigger event is an A3 trigger and the downlink power measured by the UE of the base station is not greater than a serving offset less than a serving threshold power level, then excluding as a potential handover target any of the one or more target base stations that is determined to be using NS_04; and if the handover trigger event is an A4 trigger and the downlink power measured by the UE of the base station is at least a serving offset above a serving threshold power level, the excluding as a potential handover target any of the one or more target base stations that is determined to be using NS_04.

* * * * *